(12) United States Patent  
Borisyuk et al.

(10) Patent No.: US 10,515,424 B2  
(45) Date of Patent: Dec. 24, 2019

(54) MACHINE LEARNED QUERY GENERATION ON INVERTED INDICES

(71) Applicant: Microsoft Technology Licensing, Redmond, WA (US)

(72) Inventors: Fedor Vladimirovich Borisyuk, Sunnyvale, CA (US); Krishnaram Kenthapadi, Sunnyvale, CA (US); David Stein, Mountain View, CA (US); Parul Jain, Cupertino, CA (US); Bo Zhao, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 359 days.

(21) Appl. No.: 15/430,005

(22) Filed: Feb. 10, 2017

(65) Prior Publication Data

US 2017/0235788 A1 Aug. 17, 2017

Related U.S. Application Data

(60) Provisional application No. 62/294,754, filed on Feb. 12, 2016.

(51) Int. Cl.
*G06F 17/30* (2006.01)
*G06Q 50/00* (2012.01)
*G06N 20/00* (2019.01)
*G06F 16/22* (2019.01)

(52) U.S. Cl.
CPC ......... *G06Q 50/01* (2013.01); *G06F 16/2272* (2019.01); *G06N 20/00* (2019.01)

(58) Field of Classification Search
CPC ..... G06F 16/2272; G06Q 50/01; G06N 20/00
See application file for complete search history.

(56) References Cited

U.S. PATENT DOCUMENTS

| | | | |
|---|---|---|---|
| 8,832,132 B1* | 9/2014 | Spertus | H04L 67/306 707/765 |
| 9,519,716 B2* | 12/2016 | Athsani | G06Q 30/0256 |
| 9,589,060 B1* | 3/2017 | MacGillivray | G06F 16/243 |
| 2004/0243557 A1* | 12/2004 | Broder | G06F 17/2785 |
| 2005/0071328 A1* | 3/2005 | Lawrence | G06F 16/9535 |
| 2008/0294621 A1* | 11/2008 | Kanigsberg | G06Q 30/02 |
| 2011/0029517 A1* | 2/2011 | Ji | G06F 16/951 707/734 |
| 2011/0264642 A1* | 10/2011 | Mital | G16H 10/60 707/706 |
| 2012/0233140 A1* | 9/2012 | Collins-Thompson | G06F 16/3338 707/706 |

(Continued)

*Primary Examiner* — Alicia M Willoughby
(74) *Attorney, Agent, or Firm* — Schwegman Lundberg & Woessner, P.A.

(57) ABSTRACT

Methods and systems for generating queries from a behavioral index model are described. According to various embodiments, a system receives a query input including one or more search terms from a client device associated with a member profile. The system generates a query from the one or more search terms and one or more profile terms. The system causes one or more query machines to search one or more inverted indices using the query and receives one or more result of documents distributed across the inverted indices. The system generates an ordered list of the one or more result sets and causes presentation of the ordered list at a client device associated with the member profile.

14 Claims, 16 Drawing Sheets

(56) References Cited

U.S. PATENT DOCUMENTS

| | | | |
|---|---|---|---|
| 2012/0239519 A1* | 9/2012 | Wu | G06Q 30/06 705/26.3 |
| 2013/0110827 A1* | 5/2013 | Nabar | G06F 16/9535 707/728 |
| 2014/0129552 A1* | 5/2014 | Sinha | G06F 16/24578 707/724 |
| 2014/0244531 A1* | 8/2014 | Baldwin | G06Q 10/1053 705/319 |
| 2014/0279995 A1* | 9/2014 | Wang | G06F 16/3334 707/706 |
| 2014/0280063 A1* | 9/2014 | Sen | G06F 16/904 707/722 |
| 2015/0199431 A1* | 7/2015 | Brunet | G06F 16/9535 705/304 |
| 2015/0288744 A1* | 10/2015 | Dwan | G06F 16/951 709/217 |
| 2016/0140241 A1* | 5/2016 | Weyerhaeuser | G06F 16/9535 707/710 |
| 2016/0154865 A1* | 6/2016 | Daniel | G06F 16/254 707/602 |
| 2016/0162502 A1* | 6/2016 | Zhou | G06F 16/90324 707/722 |

* cited by examiner

MACHINE LEARNED QUERY GENERATION ON INVERTED INDICES

CROSS-REFERENCE TO RELATED APPLICATIONS

This application claims the benefit of U.S. Provisional Application No. 62/294,754, filed Feb. 12, 2016, entitled "MACHINE LEARNED CANDIDATE SELECTION ON INVERTED INDICES," which is incorporated herein by reference in its entirety.

TECHNICAL FIELD

The present disclosure generally relates to the technical field of social-networking systems and, in one embodiment, to analyzing member provided information to generate standardized associated data sets to generate and present tailored user interface presentations.

BACKGROUND

A social networking system may allow members to declare information about themselves, such as their professional qualifications or skills. In addition to information the members declare about themselves, a social networking system may gather and track information pertaining to behaviors of members with respect to the social networking system and social networks of members of the social networking system. Analyzing a vast array of such information may help to come up with solutions to various problems that may not otherwise have clear solutions. Traditionally search engine systems allow a small number of keywords to be used for retrieval of the relevant documents, such as member profiles including the information declared by members of a social networking system.

Systems for formulating queries for information retrieval and search engine systems have been developed. These systems, implemented for search purposes, may access data stored in databases or other storage and retrieval systems. Some of these systems may return records which contain all or most of the query keywords. Some systems extended the approach of keyword search by mapping query keywords to matching predicates or ordering clauses, and casting the query to SQL or similar queries to be processed by a database system. Attempts have been made to optimize queries prior to execution in order to speed information extraction from databases. Some systems use a set of pre-defined rules to rewrite and seek a theoretical optimization of the query prior to execution in the database environment. Genetic algorithms have also been used to find Boolean query alterations to increase speed in execution in information retrieval systems. Some systems construct query modifications in a web search domain using corpus-based support vector machine (SVM) models. Non-linear SVM models have been used to classify documents and produce query modifications based on SVM output. Some systems incorporate Boolean models using an approximate Markov blanket feature selection technique to obtain the set of minimal terms and a decision tree to build the corresponding Boolean query.

Query optimization systems for long text queries have also been incorporated into information retrieval systems. Some of these systems use query reduction and query term weighting techniques. The query term weighting techniques may assign importance weight to terms within a given query. Some systems use a query term weighting approach based on the weighted dependence model for web queries. Query reduction techniques select a subset of the query to be run against a search index. Some systems using query reduction techniques may rank subqueries of the query. Some other systems for query reduction consider subqueries that differ from an original query by a single term. Conditional random field (CRF) models have been used to select subqueries of a given original query. Query reduction and query substitution do not resolve problems of real time performance limitations where a number of keywords in a content based recommendation remains unwieldy.

Some systems incorporate query expansion or substitution techniques. In these systems, parts of the query may be replaced or extended. Some systems use query substitutions where the new query is related to the original query and contains terms closely related to the original query. These systems have incorporated machine learning models for selecting between query candidates by using a number of features relating to a query/candidate pair.

Some systems attempt to block candidate selection over large datasets. These systems construct blocking keys to group entities in an offline map reduce system. Some systems construct blocking functions based on sets of blocking predicates. These systems may formulate a problem of learning a blocking function as a task of finding a combination of blocking predicates. These systems do not extend to subsets of candidate selection for recommendation systems due to high computation costs associated with enumeration of large quantities of candidate clauses in a query.

BRIEF DESCRIPTION OF THE SEVERAL VIEWS OF THE DRAWINGS

Some embodiments are illustrated by way of example and not limitation in the accompanying drawings, in which.

DETAILED DESCRIPTION

Figure 1:
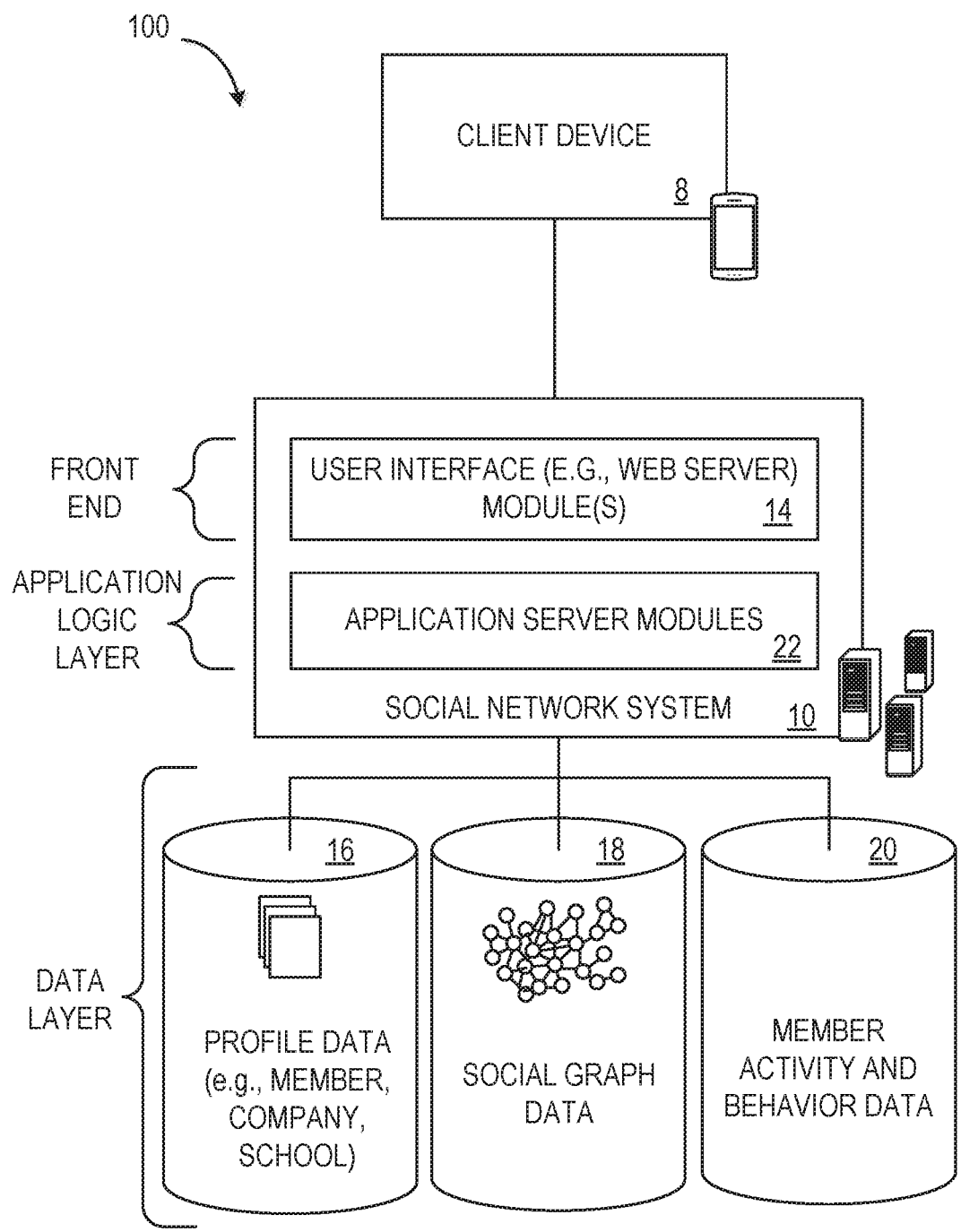
FIG. 1 is a block diagram of the functional modules or components that comprise a computer-network based social network service, including a candidate selection machine consistent with some embodiments described herein.

Social networking services provide various profile options and services. In some instances a social network may connect members (e.g., individuals associated with the social network) and organizations alike. Social networking services have also become a popular method of performing organizational research and job searching. Job listings representing openings (e.g., employment and volunteer positions) within an organization may be posted and administered by the organization or third parties (e.g., recruiters, employment agencies, etc.).

A social networking system may have a vast array of information pertaining to members of the social networking system and companies maintaining a social networking presence on the social networking system. As will be discussed in more detail below, information pertaining to members of the social networking system can include data items pertaining to education, work experience, skills, reputation, certifications, or other qualifications of each of the members of the social networking system and at particular points during the careers of these members. This information pertaining to members of the social networking system may be member generated to enable individualization of social networking profiles as well as to enable dynamic and organic interconnection between members.

User experience at social media and web platforms may be influenced by the performance and scalability of its products. Applications such as personalized search and recommendations require real-time scoring of millions of structured candidate documents associated with each query, with strict latency constraints. In such applications, the query incorporates the context of the user (in addition to search keywords if present), and hence can become very large, comprising thousands of Boolean clauses over hundreds of document attributes. Consequently, candidate selection techniques may simplify or streamline retrieval and scoring of matching documents from underlying inverted indices.

The methods and systems described herein may be implemented in real time using a search engine configured for the social networking system. In such embodiments, the methods and systems of the present disclosure describe building machine learned queries for candidate selection and execution of machine-learned queries on inverted indices. Traditionally, search engine systems may allow a small number of keywords to be used for retrieval of the relevant documents from the inverted index. Inverted indices provide a way for real time extraction of relevant documents for the information needs specified in the query format. One application which may benefit from real-time processing is job recommendation, which is a context based recommendation system. The real-time, context-based recommendation system may use member profiles stored in a structured format to perform a structured query in an index of jobs. The inverted index may be bound with an approach of machine learned candidate selection to serve recommendation results. The methods and systems may perform evaluations of differing training data approaches and parameter settings. These evaluations may monitor and identify scalability of differing candidate selection models. In some instances, the training data is built or selected for use in learning or training a candidate selection query model.

Example methods and systems for machine learned candidate selection models over structured queries and documents are described. In some embodiments, the machine learned candidate selection models may make use of Weighted AND (WAND) queries. Methods and systems described herein may prune irrelevant documents and retrieve documents that are likely to fulfill the information need of the user. The methods and systems may employ a shrinkage algorithm to learn non-negative weights for features that are used as part of the weighted candidate selection query. As described in more detail below, the methods and systems of the present disclosure may enable significant reduction in latency without sacrificing quality of retrieved results enabling more sophisticated scoring models. In the following description, for purposes of explanation, numerous specific details are set forth in order to provide a thorough understanding of example embodiments. It will be evident, however, to one skilled in the art that the embodiments of the present disclosure may be practiced without these specific details.

In the case of job recommendation retrieval, a member profile may be used as a query, which may contain a plurality (e.g., thousands) of words. In the case of the content-based recommendation (e.g., job recommendation), the systems and methods may deal with "short query" performance limitation of the inverted indexes. For example, methods and systems of the present disclosure may build job recommendations for a member of the social networking system who is looking for a senior software engineer position in United States in a specified location (e.g. Silicon Valley). The member may have experience in mathematics, Visual Studio, C++, Java, and Linux. In this particular example, if a recommendation system uses a word (e.g., software) as part of the query, just using this word may lead to estimating the likelihood that the member would fit a job for all the jobs in the Informational Technology industry. The broad estimation may be triggered because a list of documents, which contain "software," may contain hundreds of thousands of candidate job descriptions to be processed. This processing may be an expensive operation (e.g., computational expense, time expense, resource expense, and financial expense). Further, the broad estimation may capture a sufficient number of documents that the process of retrieving the documents or paring the identified results may not be possible to execute in real time.

The methods and systems of the present disclosure describe building machine learned queries for candidate selection and execution of machine-learned queries on inverted indices and may address the issues described above. These methods and systems may construct machine-learned models for candidate selection on structured inverted indices based on described feature shrinking algorithms to learn the non-negative weights for features used as part of the WAND query. The methods and systems may also use the candidate selection module to construct queries and extract candidate documents from the inverted indices.

In some embodiments, the methods and systems build queries for members of the social networking system automatically using one or more characteristics of the member. The characteristics of the member may include member activity logs, attributes of a member profile, and other suitable information describing or relating to the member. In some instances, data driven decisions based on machine learning methods can improve scalability of relevance-based recommendation and search products. Relevance-based recommendation and search products can use provided or identified content in identifying related content to fulfill a member's information needs, desires, or requests. Information for these relevance systems may be stored in inverted indices for efficient retrieval. In some embodiments, the methods and systems described herein use member interaction history (e.g., user click logs) to automatically learn a query for the inverted indices to identify and retrieve candidate documents from the social networking system, one or more databases, or one or more network locations. The process of identifying and retrieving the candidate documents may be understood as candidate selection. Although described with respect to providing job recommendations to members of the social networking system, it should be understood that the recommendation and search functionality described in the present application are applicable to areas in addition to job recommendations.

In some instances, methods and systems of the present disclosure form a recommendation engine. The recommendation engine may perform one or more functions to generate job recommendations for members of the social networking system. The social networking system may include a plurality of job postings (e.g., millions) and a plurality of members (e.g., job candidates) that are seeking jobs. The recommendation engine may be a content-based recommendation system using fields of member profiles to perform predictions indicating one or more jobs which are a suitable fit for a specified member. The member fields may include a current job title of the member, a profile summary, a member's industry, a member's functions (e.g., job functions), current job description, past job descriptions, skills, seniority of the member, education description of the member, certification descriptions of the member, and other information, data, or fields of or associated with the member profile. Each job of a plurality of jobs included in a database or other data structure may be represented as a record with a set of fields such as a title of the job, a description of the job, a required seniority of a job, one or more functions of the job, and one or more other fields. In some embodiments, the fields are populated with alphanumeric characters forming words, snippets, phrases, or sentences providing information about the job suitable for the specified field. A database including the plurality of jobs may be represented as an inverted index. In such an inverted index, for each field of a job and for each word of that field, the index may contain a sorted list of unique job identifiers that contain one or more words.

In some embodiments, as part of the job recommendation process, the methods and systems described herein query one or more inverted indices of jobs to identify job recommendations most relevant to the member. To serve the job recommendation data quickly, all of recommendations may be implemented in a manner configured to happen in real time using retrieval from inverted indexes. In some instances, the time to process a query and find or retrieve relevant job recommendations may be sensitive. In some embodiments, the retrieval process is separated into several phases. In such embodiments, in a first phase, the systems and methods use inverted indices combined with machine learned queries to extract candidate jobs. In a second phase, the methods and systems runs one or more machine learning prediction algorithms on one or more smaller subsets of jobs to find a sorted subset of jobs, which are determined to be a suitable fit to a member.

In some instances, in online service settings, a jobs database is represented as a structured inverted index. In such instances, for each field of the job and each word of the fields contained in the structured inverted index, the index contains a sorted list of unique job identifiers that contain this word in a specified field.

In some embodiments, methods and systems described herein include methods or processes for identifying and modeling machine learned queries to an inverted index. The query method may perform document retrieval based on WAND queries. In some instances, the retrieval process includes one or more operations, as described herein. For example, the operations may include iterating in parallel over a query term posting of the inverted index at a first level of a retrieval process. The query method may then identify one or more candidate documents using an approximate evaluation. The approximate evaluation may take into account partial information on term occurrences. In some instances, the evaluation may ignore query independent factors. The method may then include one or more operations to evaluate promising candidates. The evaluation operation may include identifying or generating a score for each candidate. The scores may be generated using a logistic regression classifier or other suitable techniques.

Other aspects of the present inventive subject matter will be readily apparent from the description of the figures that follow.

FIG. 1 is a block diagram of the functional modules or components that comprise a computer- or network-based social network system 10 consistent with some embodiments of the inventive concepts of the present disclosure. As shown in FIG. 1, the social networking system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions (e.g., an instruction set executable by a processor) and the corresponding hardware (e.g., memory and processor) for executing the instructions. To avoid obscuring the inventive subject matter, various functional modules and engines that are not germane to conveying an understanding of the inventive subject matter have been omitted from FIG. 1. However, a skilled artisan will readily recognize that various additional functional modules and engines may be used with a social networking system 10, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end comprises a user interface module 14 (e.g., a web server), which receives requests from various client devices 8, and communicates appropriate responses to the requesting client devices 8. For example, the user interface module 14 may receive requests in the form of Hypertext Transport Protocol (HTTP) requests, or other web-based, application programming interface (API) requests. The client devices 8 may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may use a bi-lateral agreement by the members, such that both members acknowledge the establishment of the connection. Similarly, with some embodiments, a member may elect to "follow" another member. In contrast to establishing a "connection," the concept of "following" another member typically is a unilateral operation, and at least with some embodiments, does not include acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a social graph database (e.g., database 18), which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module 14, generate various user interfaces (e.g., web pages) with data retrieved from various data sources in the data layer. With some embodiments, individual application server modules are used to implement the functionality associated with various applications, services and features of the social network service. For instance, a messaging application, such as an email application, an instant messaging application, a social networking application native to a mobile device, a social networking application installed on a mobile device, or some hybrid or variation of these, may be implemented with one or more application server modules implemented as a combination of hardware and software elements. Of course, other applications or services may be separately embodied in their own application server modules.

As shown in FIG. 1, a candidate selection machine 22 is an example application server module of the social networking system 10. The candidate selection machine 22 performs operations to automatically generate queries based on candidate query models to provision structured documents to a member of the social networking system 10. In some embodiments, the candidate selection machine 22 operates in conjunction with the user interface modules 14 to receive member input and generate tailored user interface presentations based on the provisioned structured documents.

The social networking system 10 may provide a broad range of applications and services that allow members the opportunity to share and receive information, often customized to the interests of the member. For example, with some embodiments, the social networking system 10 may include a photo sharing application that allows members to upload and share photos with other members. As such, at least with some embodiments, a photograph may be a property or entity included within a social graph. With some embodiments, members of a social networking system 10 may be able to self-organize into groups, or interest groups, organized around a subject matter or topic of interest. Accordingly, the data for a group may be stored in a database (not shown). When a member joins a group, his or her membership in the group will be reflected in the social graph data stored in the database 18. With some embodiments, members may subscribe to or join groups affiliated with one or more companies. For instance, with some embodiments, members of the social networking system 10 may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database 18.

Figure 2:
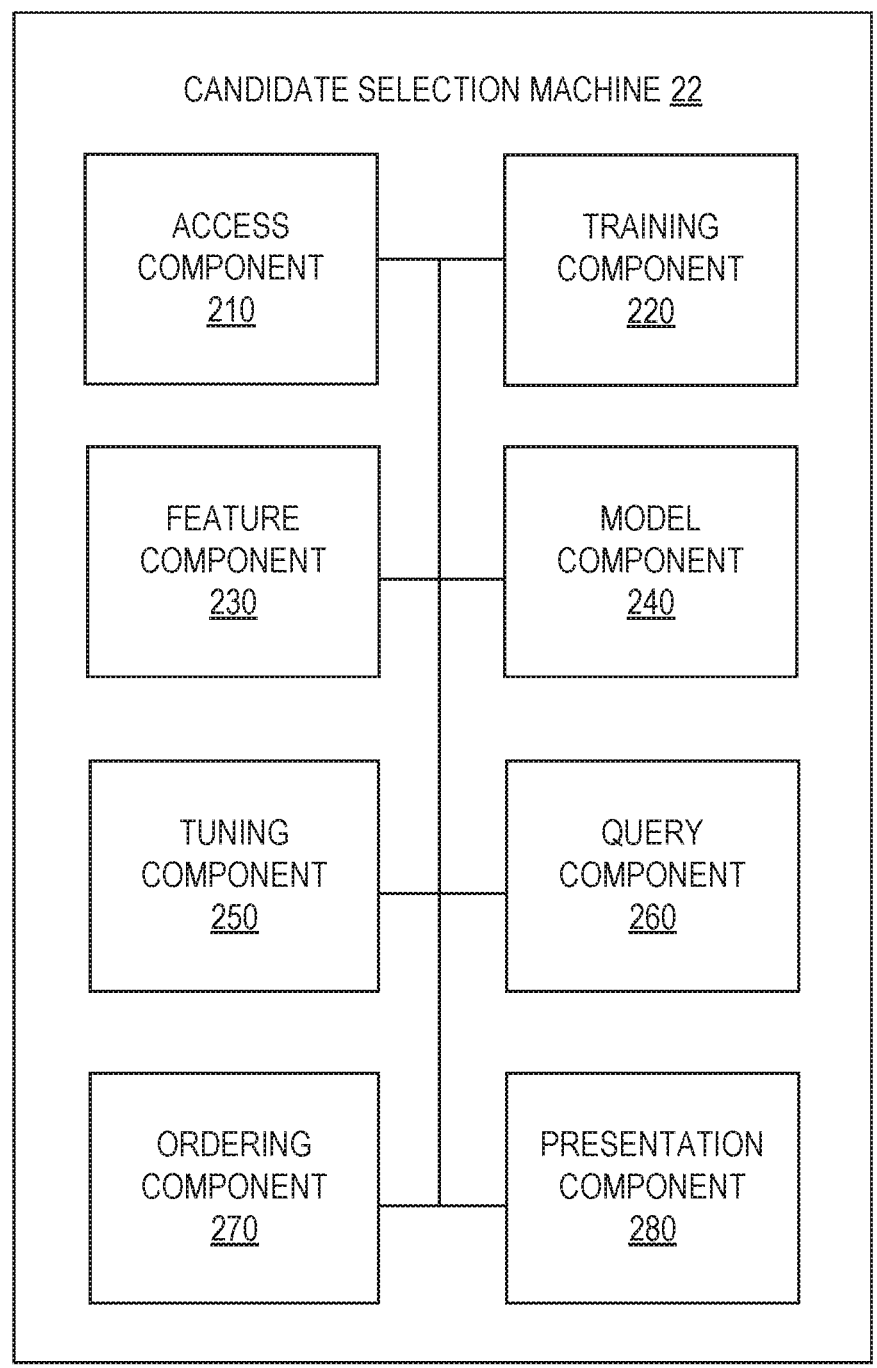
FIG. 2 is a block diagram depicting some example components of the candidate selection machine of FIG. 1.

FIG. 2 is a block diagram depicting some example modules of the candidate selection machine 22 of FIG. 1. The candidate selection machine 22 is shown including an access component 210, a training component 220, a feature component 230, a model component 240, a tuning component 250, a query component 260, an ordering component 270, and a presentation component 280 all configured to communicate with each other (e.g., via a bus, shared memory, a switch, or a network). Operations and functionality of the above-referenced components are described in more detail below. Any one or more of the modules described herein may be implemented using hardware (e.g., one or more processors specifically configured to perform the operations described herein) or a combination of hardware and software, forming a hardware-software implemented module. For example, any module described herein may configure a processor (e.g., among one or more processors of a machine) as a special purpose machine, during the pendency of a set of operations, to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
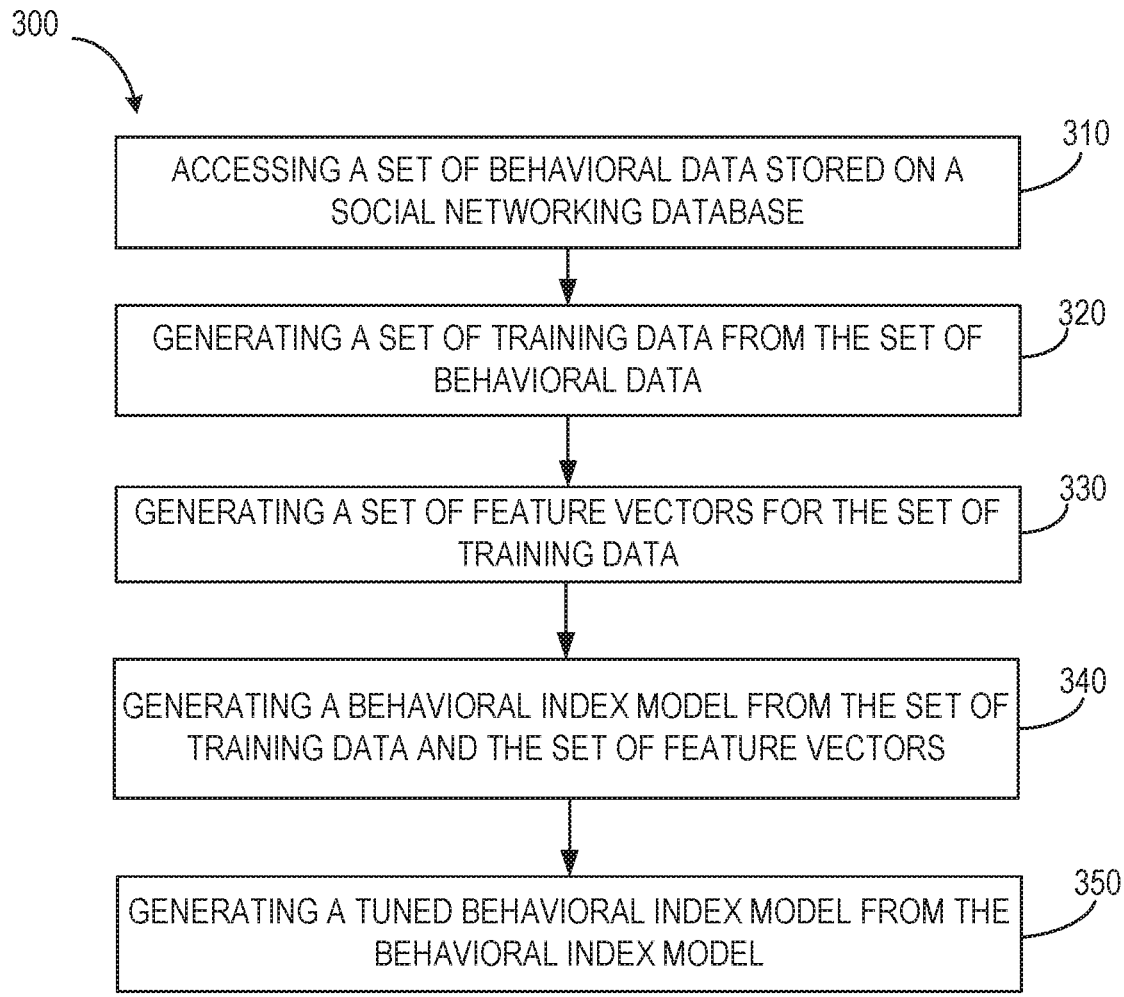
FIG. 3 is a flow diagram illustrating an example method of generating a behavioral index model, according to some embodiments of the present disclosure.

FIG. 3 is a flow diagram illustrating an example method 300 of developing a behavioral index model, consistent with various embodiments described herein. The behavioral index model may be used in conjunction with one or more methods of the present disclosure to learn and construct machine-learned queries. The method 300 may be performed, at least in part, by, for example, the candidate selection machine 22 illustrated in FIG. 2 (or an apparatus having similar components or operative programming, such as one or more client machines or application servers).

In operation 310, the access component 210 accesses a set of behavioral data stored on a social networking database. The set of behavioral data may be stored in association with a set of user profiles within a social networking database. In some embodiments, the set of behavioral data comprises one or more of interaction data and impression data. In some embodiments, the access component 210 collects and stores behavior data for the members or a subset of the members of the social networking system. The access component 210 may collect the interaction data via member interactions with a user interface of the candidate selection machine 22. The candidate selection machine 22 may base decisions on one or more of the interaction data and the impression data (e.g., data of member behavior).

The interaction data may represent interaction selection data stored on the social networking database. For example, the interaction data may include click logs, tracking data, interaction data (e.g., scrolling, copying, forwarding, or replying), or other suitable activity data. By way of further example, interaction data may include member selections of recommendations provided by the candidate selection machine 22, locations of a user selection within the recommendation, and selections causing presentation of details for a specified recommendation. The interaction data may be generated for a user profile of the set of user profiles after receiving a login indication for the user profile. In some embodiments, the methods and systems may base decisions at least in part on the interaction data, represented as click logs, tracking data, interaction data, and other suitable activity data. Interaction data collected or used as a basis for decisions may be limited by one or more account, profile, or device settings. For example, interaction data may be collected in compliance with default or user selected privacy settings for an account, a profile, or a device. Collection and use of interaction data may similarly be filtered, guided, or limited based on device capabilities (e.g., collecting and using interaction data only from specified or compatible components of a device). In some embodiments, collection and use of interaction data is performed in a manner to anonymize the interaction data or limit identifying data to a specified user or member. Such embodiments enable the candidate selection machine 22 to generate recommendations for a member while maintaining privacy for the member.

The impression data may represent a display of data or presentation of data at a client device associated with a user profile of the set of user profiles after receiving a login indication for the user profile. For example, the impression data may include indications of member profiles, presentations, video streams, websites, webpages, or any other data which may be presented to a user and accessed by the social network. As such, the impression data may include information which the member saw, or is imputed to have seen, such as recommendations. The data displayed may be data stored on the social networking database. In some instances, the impression data is stored as metadata representing the data displayed on the client device and indicating an identification for each element of the data which has been displayed. The metadata may also include an indication that a display of the data has occurred and a time, location, or machine at which the display occurred. Collection and use of the impression data may be subject to similar privacy protections and considerations as described above with respect to the interaction data.

In operation 320, the training component 220 generates a set of training data from the set of behavioral data. The set of training data may be prepared from the set of behavioral data which may be in the form of tracking data identifying interactions and impressions associated with the member profile. The set of training data may be generated by initially identifying positive data and negative data within the set of behavioral data. Once the positive data and negative data have been identified, the training component 220 selects a subset of positive data and a subset of negative data for inclusion in the set of training data.

Positive and negative training data may have differing effects on machine learning methods. In some embodiments, negative training data is part of the interaction data (e.g., the tracking data) where a member refrains from performing actions on a given recommendation or search result. In some instances, positive training data is part of the interaction data (e.g., the tracking data) where a member acted on information (e.g., impression data, recommendations, or search results) provided, displayed, or presented to the member. For example, in context of job recommendations, positive training data may include instances in which a member viewed details of a job (e.g., selected a user interface element to cause presentation of the details) or applied for the job. This, in turn, may indicate that member interaction with a particular job represents a member fit for such positions or an interest in a specified job in comparison to other jobs. In some embodiments, as described in more detail below, variations of training data may be incorporated into evaluations of models produced by the methods and system described herein.

As referenced above, as part of the positive data, the training component 220 may select one or more interactions corresponding to impression data. The one or more interactions may be discrete instances of interaction data. The training component 220 may determine a correspondence of a discrete interaction and a specified instance of impression data where the interaction is performed within a period of time occurring after presentation of the specified instance of impression data. The correspondence may also be represented as an association or link between the interaction data and the impression data in a data structure. The training component 220 may identify an interaction as positive data where the interaction, corresponding to the impression data, causes further interaction with the impression data. For example, a selection of a link, which accesses the instance of impression data (e.g., a title of a job recommendation or a search result) or causes presentation additional data (e.g., a job announcement linked to the job recommendation or a website linked to the search result) relating to the instance of impression data, may be identified as positive data.

As part of the negative data, the training component 220 may select one or more impressions having no corresponding interactions. In some instances, the training component 220 selects one or more interactions as negative data, where the one or more interactions are of a negative type. For example, the training component 220 may identify an interaction corresponding to a specified impression, similar to the manner described above. The training component 220 then determines that the interaction is associated with a negative type or indicates a negative reaction to the impression. Upon determining the negative type for the interaction, the training component 220 may select the interaction for inclusion in the negative data subset of the set of training data.

Although described as including positive data and negative data, the training component 220 may generate the training data from differing amounts of positive and negative data. For example, the training component 220 may generate the set of training data to comprise only positive data, only negative data, a combination of positive and negative data, a combination of data having a greater amount of positive data, a combination of data having a greater amount of negative data, a specified ratio of negative data to positive data, or a randomized combination of positive and negative data. By way of further example, in one iteration of developing a behavioral index model, the training component 220 may select a set of training data having a first distribution of positive and negative data. In a subsequent iteration of developing a behavioral index model, or retraining a previously developed behavioral index model, the training component 220 may select a different set of training data (e.g., differing instances of positive and negative data) or a set of training data having a second distribution of positive and negative data, such that the second distribution is different than the first distribution.

In some instances, as described in more detail below, the training component 220 trains the behavioral index model offline, using data points identified within the tracking data. The offline data set may be separated into three subsets. The three subsets may include a training set, a validation set, and a test set. The training set may be used to train the model. For example, the training set may be used to train the model using a "feature shrinking" method, described herein. The training component 220 may use applied L2 regularization with the training set to prevent over-fitting of the model. The validation set (e.g., a validation training data subset) may be used to identify a theoretical best model, which may then be used to generate and report information or metrics using the test set.

In operation 330, the feature component 230 generates a set of feature vectors from the set of training data. The set of feature vectors may identify fields within two distinct portions of the set of training data. In some embodiments, to generate the set of feature vectors, the feature component 230 identifies a training pair from portions of the set of training data. In such embodiments, the set of training data may comprise distinct training elements. Each training element may represent an interaction and an impression. The interaction of a training element may be associated with a member profile. The member profile with which the interaction is associated may be a member profile for a member performing the interaction or a member profile logged in at a time of performing the interaction. The impression may similarly be associated with target data. The impression represents at least a portion of the target data presented within a user interface and associated with the interaction.

In generating the set of feature vectors, the feature component 230 may construct a set of clauses from the set of training data. The set of clauses may be constructed for weighted OR queries using a set of fields from source data and target data. The target data may be stored in inverted indices. In such embodiments, the set of clauses are constructed as a set of pairs of fields. The pairs of fields may be represented as <Source Field, Target Field>. The "Source Field" element contains source data. The source data may be included in one or more fields of a member profile (e.g., current title, past titles, skills, or education). The field from which the source data is selected or obtained may be determined based on the interaction performed, a search leading to presentation of the impression data, a characteristic of the impression data, or any other suitable selection basis. The "Target Field" element contains target data. The target data may be included in one or more fields or portions of a target source, such as a job posting, a publication, or other suitable information source. The fields or portions of the target source may comprise information similar to that within the one or more fields of the member profile. For example, where the target source is a job posting, the target fields may comprise titles, skills, education, or other information related to the job for which the job posting was created.

In some instances, the set of clauses comprise a set of F possible pairs of fields. For example, a pair of fields included in a set of F possible pairs may be represented as (member-Title ∩ job-Title). The feature component 230 constructs a set T of all possible "k-tuples." In some instances, the set T has a defined size. The size may be defined by Equation 1 below.

$$\sum_{k=0}^{K}\binom{|F|}{k}$$ Equation 1

In some embodiments, the size of set T corresponds to a size of a weighted AND query of all possible tuples of fields of source fields and target fields. Such a WAND query may be a group or set of Boolean conjunctional clauses. In such instances, an example of a clause may comprise (member-Title ∩ job-Title) ∩ (member-Skills ∩ job-Skills).

In some embodiments, the feature component 230 generates the set of feature vectors by identifying a training pair. The training pair may be a representation of a training element, indicating the member profile and the target data associated with the training element. In such embodiments, a training pair may be represented as <Input document field, Target document field>, similar to the representation above. The "Input document field" represents information from a field of a member profile. The field may be determined based on the interaction performed, a search leading to presentation of the impression data, or any other suitable information. The "Target document fields" represents information from a field of a document presented within an impression or selected from such a document.

In response to identifying the training pair, the feature component 230 constructs a feature vector comprising Boolean features. In some instances, the Boolean features are represented as conjunctional clauses, as described above. In some embodiments, a conjunctional clause has a value of one when an input document field of the conjunctional clause matches a threshold number of tuples (e.g., all K tuples) of target document fields. In embodiments where a threshold number of tuples is all K tuples, for all tuples of input fields and respective target fields, a respective cosine similarity between vectors of words of the input and target fields is non-zero. Such a cosine similarity may be represented as Equation 2, below.

$$\text{Cosine(Input, Target)} = \frac{\sum_{i=0}^{M} Input_i * Target_i}{\sqrt{\sum_{i=0}^{M} Input_i^2} * \sqrt{\sum_{j=0}^{M} Target_j^2}}$$ Equation 2

In operation 340, the model component 240 generates a behavioral index model from the set of training data and the set of feature vectors. The behavioral index model may be generated using one or more machine learning algorithms. In some embodiments, the model component 240 performs one or more machine learning algorithms to generate the behavioral index model. The one or more machine learning algorithms may identify or find parameters for the weighted learned query to an inverted index storing the target data.

In some instances, the weights may be learned using one or more machine learning algorithms or methods, such as one or more of the machine learning algorithms described herein or one or more standard machine learning algorithms. In some embodiments, a machine learning method used to identify weights is a logistic regression classifier, such as hw(X)=1/1+exp−WT*X. Constraints for the logistic regression classifier may include any suitable constraints, such as a constraint indicating that components of vector X are positive. To train a logistic regression model for the set of training data (e.g., a candidate selection training dataset), pairs may be used, such as <Input document fields, Target document fields>, described above in more detail. In such embodiments, the pairs are used to construct a feature vector of Boolean features represented in one or more conjunctional clauses. Although described with respect to a specified machine learning algorithm, it should be understood that the behavioral index model or aspects thereof may be generated using any suitable machine learning method described herein or any suitable machine learning method known in the art.

In some embodiments, the input to the one or more machine learning algorithms comprises information selected from the set of training data and the set of feature vectors. In such embodiments, the input comprises a set of training examples represented as tuples. A tuple may include elements from one or more of the set of training data and the set of feature vectors. In some instances, a tuple is represented as <identifier, label, feature vector>. The identifier may be a training example identifier. The label may be a training example label. The feature vector may be a training example feature vector selected from the set of feature vectors generated in operation 330, described above.

The model component 240 may learn one or more weights, for the behavioral index model, of the weighted OR query or the weighted AND query. In some instances, the model component 240 learns the one or more weights using one or more of the aspects described above. For example, the model component 240 may learn the one or more weights using the logistic regression classifier. In such instances, the model component 240 may use a logistic regression classifier, which may be represented in whole or in part by Equation 3 below.

$$h_w(X) = \frac{1}{1 + e^{-W^T * X}}$$ Equation 3

As represented in Equation 3, W is a positive vector (e.g., $W_i > 0$).

In operation 350, the tuning component 250 generates a tuned behavioral index model from the behavioral index model. The tuned behavioral index model may be generated by tuning a threshold of the behavioral index model using a precision recall curve. The precision recall curve can be constructed by measuring precision and recall values. The precision recall curve and the values for precision and recall may depend on different values of a threshold parameter of the process used to generate the behavioral index model by the model component 240. The tuning component 250 may use one or more inputs for threshold selection and generation of the tuned behavioral index model. In some instances, the one or more inputs comprise a specified recall value and a training data set.

In some embodiments, generating the tuned behavioral model includes a set of sub-operations. In these embodiments, the tuning component 250 initially subdivides the set of training data into three training data subsets. The training data subsets may include a training data subset, a validation data subset, and a test data subset. In some instances, the tuning component 250 subdivides the set of training data randomly into the three subsets. Subdivision of the set of training data may be pseudo-random, based on one or more thresholds for the set of training data, based on characteristics common among the training data, based on a distribution of characteristics within the training data, or based on any other suitable metric. Upon subdividing the set of training data, the tuning component 250 generates a precision recall curve from the validation data subset for one or more values of a threshold parameter. The precision recall curve may be generated or constructed by measuring precision values and recall values in response to changes to or depending on different values of the threshold parameter.

In response to generating the precision recall curve, the tuning component 250 selects a value of the threshold parameter associated with a specified recall value. For example, the specified recall value may be set at eighty, eighty-five, ninety, ninety-five, or ninety-nine percent. Although example recall values may be included within the present disclosure, it should be understood the specified recall value may be any suitable value. Further, the specified recall value may be based on one or more characteristics of a desired precision recall curve, one or more previously generated precision recall curves, or one or more theoretical precision recall curves.

In some embodiments, the tuning component 250 may tune a behavioral index model based on candidate selections, characteristics of a member profile, or any other suitable prompt. The prompt may also provide one or more inputs for consideration in the tuning of the behavioral index model. For example, where the characteristics of the candidate member profile indicate a relatively low level of completion (e.g., information or fields of the member profile have no associated data or are determined to be vague), the tuning component 250, alone or in combination with one or more other components, may train a looser behavioral index model.

Figure 4:
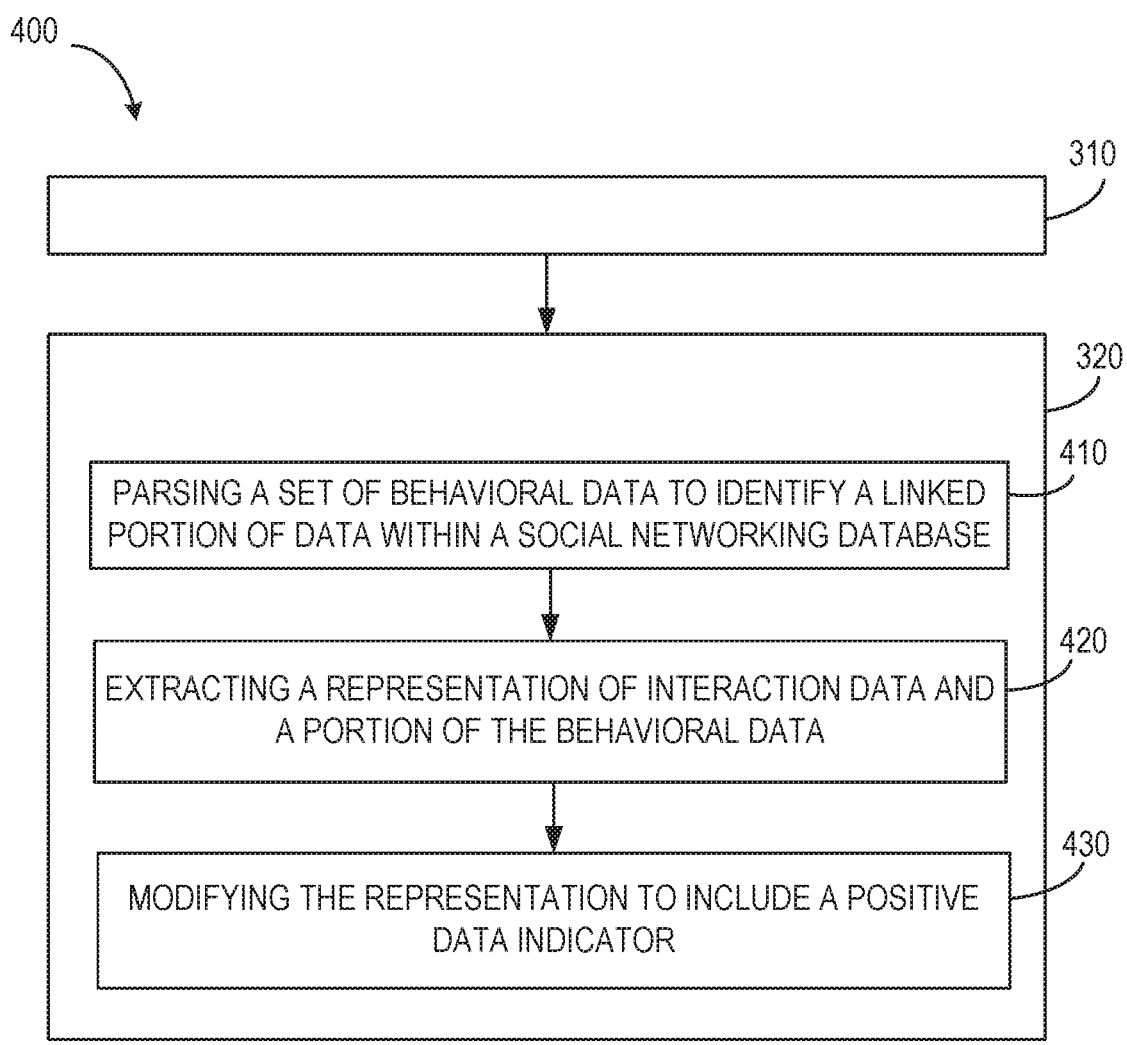
FIG. 4 is a flow diagram illustrating an example method of generating a behavioral index model, according to some embodiments of the present disclosure.

FIG. 4 is a flow diagram illustrating an example method of developing a behavioral index model, consistent with various embodiments described herein. The method 400 may be performed, at least in part, by, for example, the candidate selection machine 22 illustrated in FIG. 2 (or an apparatus having similar components, such as one or more client machines or application servers). In some embodiments, the method 400 includes one or more operations from the method 300. In some instances, the method 400 is performed as a sub-operation or other part of operation 320.

In operation 410, the training component 220 parses the set of behavioral data to identify a linked portion of data within the social networking database. The linked portion of data is associated with interaction data included within the portion of the behavioral data of the set of behavioral data. In some embodiments, the training component 220 retrieves tracking data, described above with respect to method 300.

In operation 420, the training component 220 extracts a representation of the interaction data and the portion of the data. In some embodiments, the training component 220 selects training data from the set of behavioral data which includes, references, or responds to an interaction in the tracking data. For example, the training component 220 may select behavior data indicating an interaction which causes display or presentation of an impression, selects an impression to cause presentation of further detail or accessing of a document (e.g., a job posting) represented by the impression, or selects an action related to the impression, such as applying for a job in response to presentation of a job posting. Once behavioral data, corresponding to an interaction, has been selected, the training component 220 extracts a portion of the interaction data and a portion of the data from the selected behavioral data. In such embodiments, the interaction data indicates an action taken by a user and the portion of data indicates characteristics of the action with respect to the impression data.

In operation 430, the training component 220 modifies the representation to include a positive data indicator. The positive data indicator defines the interaction as positive. Of the interaction data and behavioral data extracted in operation 420, the training component 220 may select representations to include the positive data indicator where the interaction or the characteristics of the interaction indicate the member performing the interaction showed a positive reaction to the impression data. For example, the positive data indicator may indicate a user would prefer to act on a given piece of data based on an interaction selection to view the data or interact with the data, such as by applying for a job included in a job posting. By way of further example, where the candidate selection machine 22 provides job recommendations to members, a positive interaction receiving a positive data indicator may indicate that the member acted upon the impression due to a subjective believe that the member would be a fit for such a position, in comparison to other job recommendations.

Figure 5:
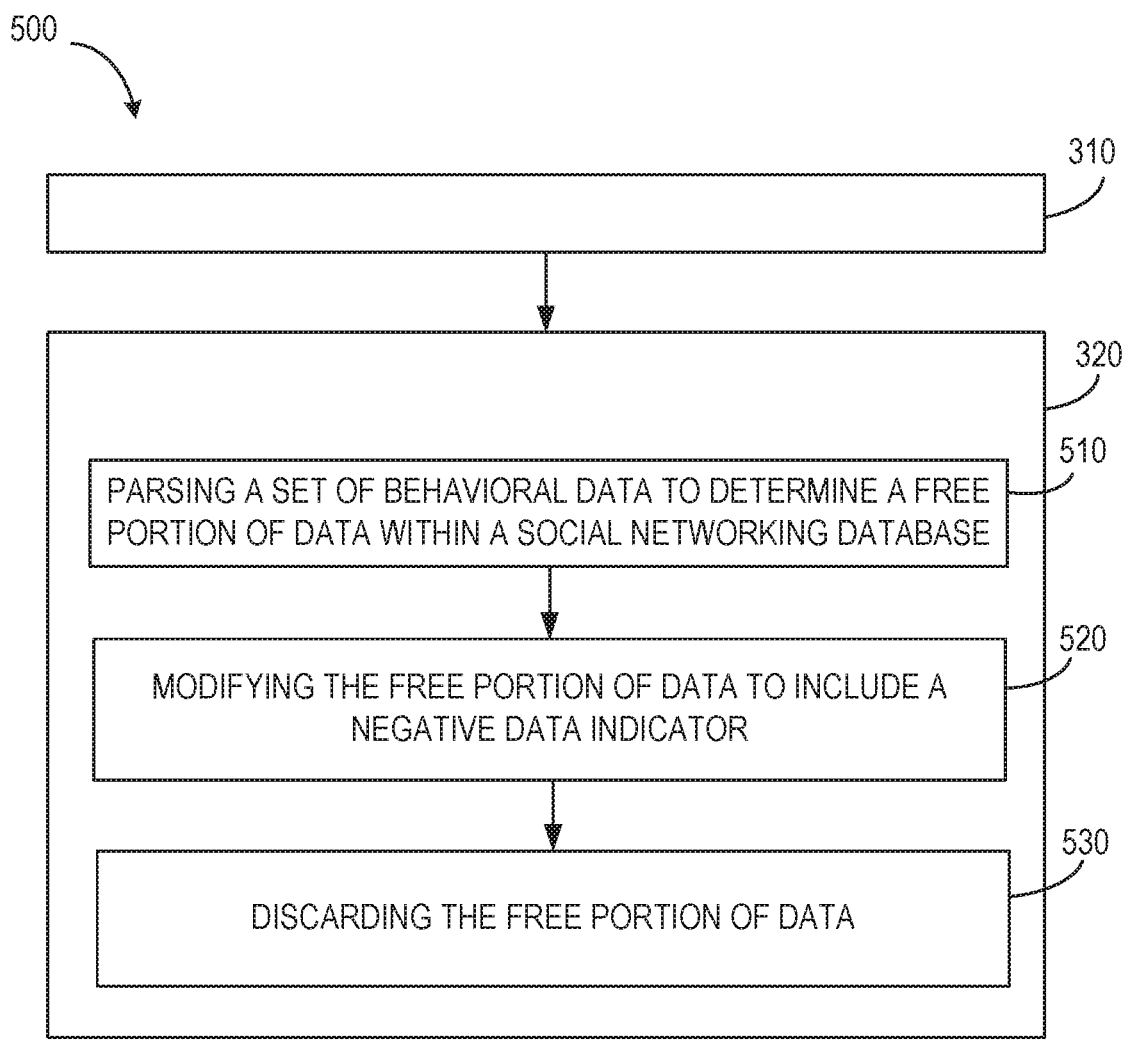
FIG. 5 is a flow diagram illustrating an example method of generating a behavioral index model, according to some embodiments of the present disclosure.

FIG. 5 is a flow diagram illustrating an example method of developing a behavioral index model, consistent with various embodiments described herein. The method 500 may be performed, at least in part, by, for example, the candidate selection machine 22 illustrated in FIG. 2 (or an apparatus having similar components, such as one or more client machines or application servers). In some embodiments, the method 500 includes one or more operations from the method 300. In some instances, the method 500 is performed as a sub-operation or other part of operation 320.

In operation 510, the training component 220 parses the set of behavioral data to determine a free portion of data within the social networking database. The free portion of data represents data presented at the client device associated with the member profile of the set of member profiles. The free portion is unassociated with interaction data included within a portion of the behavioral data of the set of behavioral data.

In operation 520, the training component 220 modifies the free portion of data to include a negative data indicator. In some embodiments, the negative indicator represents no action taken on impression data or in response to impression data. For example, the negative indicator may be applied where impression data is presented at a client device associated with the member profile, and the impression data is removed from presentation due to selection of other impression data or due to scrolling or otherwise moving a visible portion of the user interface to reveal additional impression data. In some instances, the negative indicator represents a negative action taken on impression data or in response to impression data. For example, a negative action may comprise selection of a portion of impression data as irrelevant or unwanted, selecting a navigation element in a user interface directing an application or browser away from display of the impression data, or any other suitable selection or interaction indicating a negative impression of the impression data.

In operation 530, the training component 220 discards the free portion of data from inclusion in the behavioral index model. In some embodiments, the training component 220 discards the free portion of data, such that the model component 240 generates the behavioral index model using only positive training data (e.g., training data including the positive data indicator described in operation 430).

Although described as discarding the free portion of data, in some embodiments, the training component 220 determines a model generation mode of the model component 240 prior to discarding the free portion of data. In such embodiments, where the training component 220 determines the model component 240 is generating the behavioral index model using only positive training data, the model component 240 excludes the free portion of data from available training data presented to the model component 240 as input for the behavioral index model. Where the training component 220 determines the model component 240 is generating the behavioral index model using both positive training data and negative training data, the training component 220 retains the free portion of data, making the free portion of data available to the model component 240 for input to the behavioral index model or in generating such a model. Where the training component 220 determines the model component 240 is generating the behavioral index model using only negative training data, the training component 220 retains the free portion of data, making the data available to the modeling component 240 for training the model.

Figure 6:
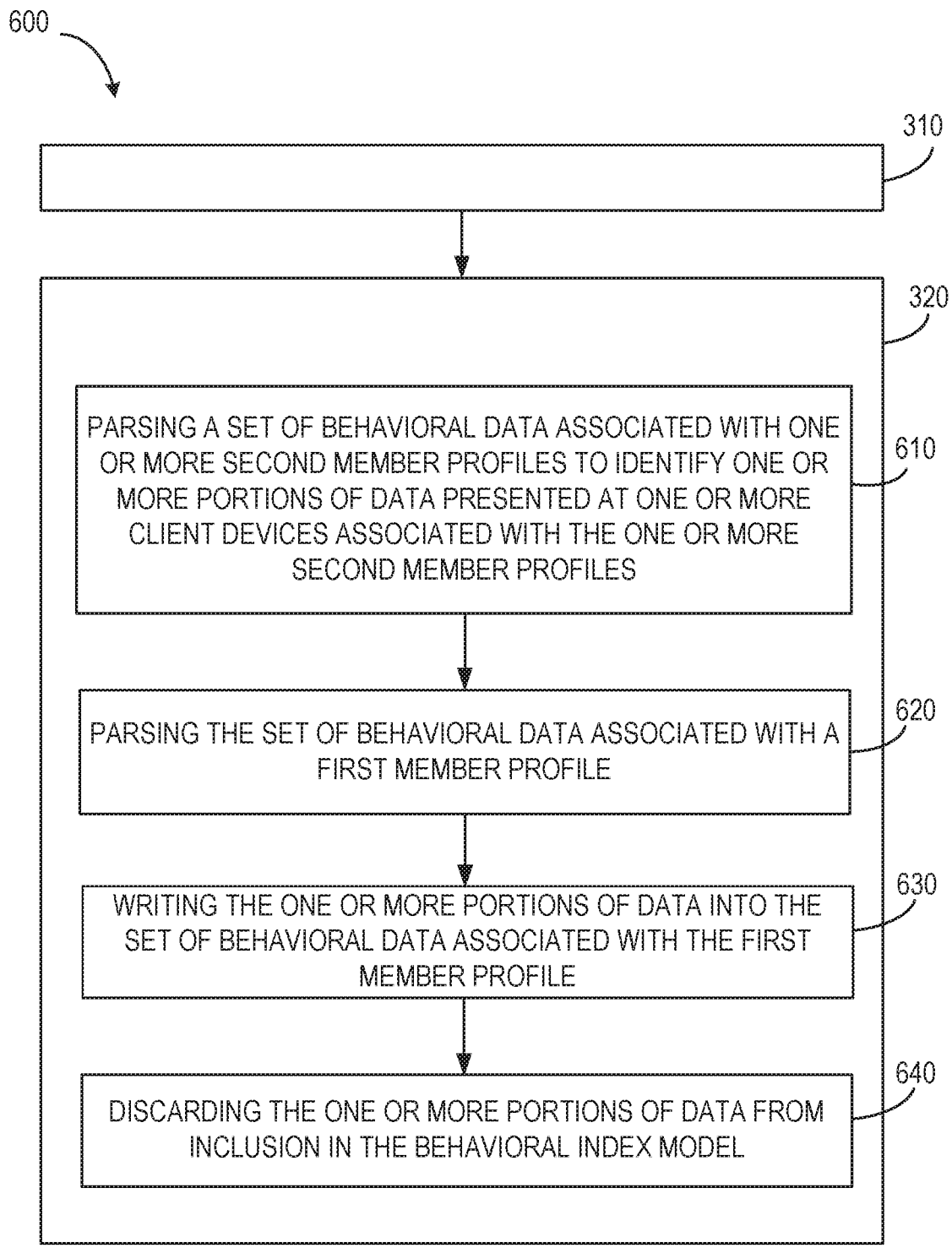
FIG. 6 is a flow diagram illustrating an example method of generating a behavioral index model, according to some embodiments of the present disclosure.

FIG. 6 is a flow diagram illustrating an example method of developing a behavioral index model, consistent with various embodiments described herein. The method 600 may be performed, at least in part, by, for example, the candidate selection machine 22 illustrated in FIG. 2 (or an apparatus having similar components, such as one or more client machines or application servers). In some embodiments, the method 600 includes one or more operations from the method 300. In some instances, the method 600 is performed as a sub-operation or other part of operation 320. In these instances, the behavioral index may be generated for a first member profile of a set of member profiles. The first member profile may be determined to be similar to one or more second member profiles of the set of member profiles.

In operation 610, the training component 220 parses the set of behavioral data associated with the one or more second member profiles to identify one or more portions of data presented at one or more client devices associated with the one or more second user profiles. The training component 220 may identify the one or more portions of data in a manner similar to or the same as described above with respect to operations 410 or 510.

In operation 620, the training component 220 parses the set of behavioral data associated with the first member profile. The training component 220 identifies unpresented portions of data for the first member profile. The unpresented portions of data have been presented at the one or more client devices associated with the one or more second member profiles and unpresented at a client device associated with the first member profile.

In operation 630, the training component 220 writes the one or more portions of data into the set of behavioral data associated with the first member profile. The one or more portions of the data may include a negative data indicator. The negative data indicator, in such embodiments, indicates that the unpresented impression data is an instance of random negative training data. A set of random negative training data represents impression data presented to other members of the social networking system 10 and not presented to or in association with the first member profile. Whether the behavioral data is designated with the negative data indicator due to adverse interaction, no interaction, or no presentation, such designation may indicate that the impression data is information for which a member (e.g., the member associated with the first member profile) would refrain from performing actions if included or when included in a recommendation or as part of a set of search results.

In operation 640, the training component 220 discards the one or more portions of data from inclusion in the behavioral index model. In some embodiments, the training component 220 discards the set of random negative data, such that the model component 240 generates the behavioral index model using only positive training data (e.g., training data including the positive data indicator described in operation 430).

Although described as discarding the set of random negative data, in some embodiments, the training component 220 determines a model generation mode of the model component 240 prior to discarding the set of random negative data. In such embodiments, where the training component 220 determines the model component 240 is generating the behavioral index model using only positive training data, the model component 240 excludes the set of random negative data from available training data presented to the model component 240 as input for the behavioral index model. Where the training component 220 determines the model component 240 is generating the behavioral index model using both positive training data and negative training data, the training component 220 may retain one or more of the free portions of data and the set of random negative data, making the retained negative data (e.g., the free portion or the set of random negative data) available to the model component 240 for input to the behavioral index model or in generating such a model. Where the training component 220 determines the model component 240 is generating the behavioral index model using only negative training data, the training component retains one or more of the free portions of data and the set of random negative data, making the data available to the modeling component 240 for training the model. In embodiments where the model component 240 incorporates negative training data, the model component 240 may select negative training data from the free portion of data, the set of random negative data, or combinations thereof.

Figure 7:
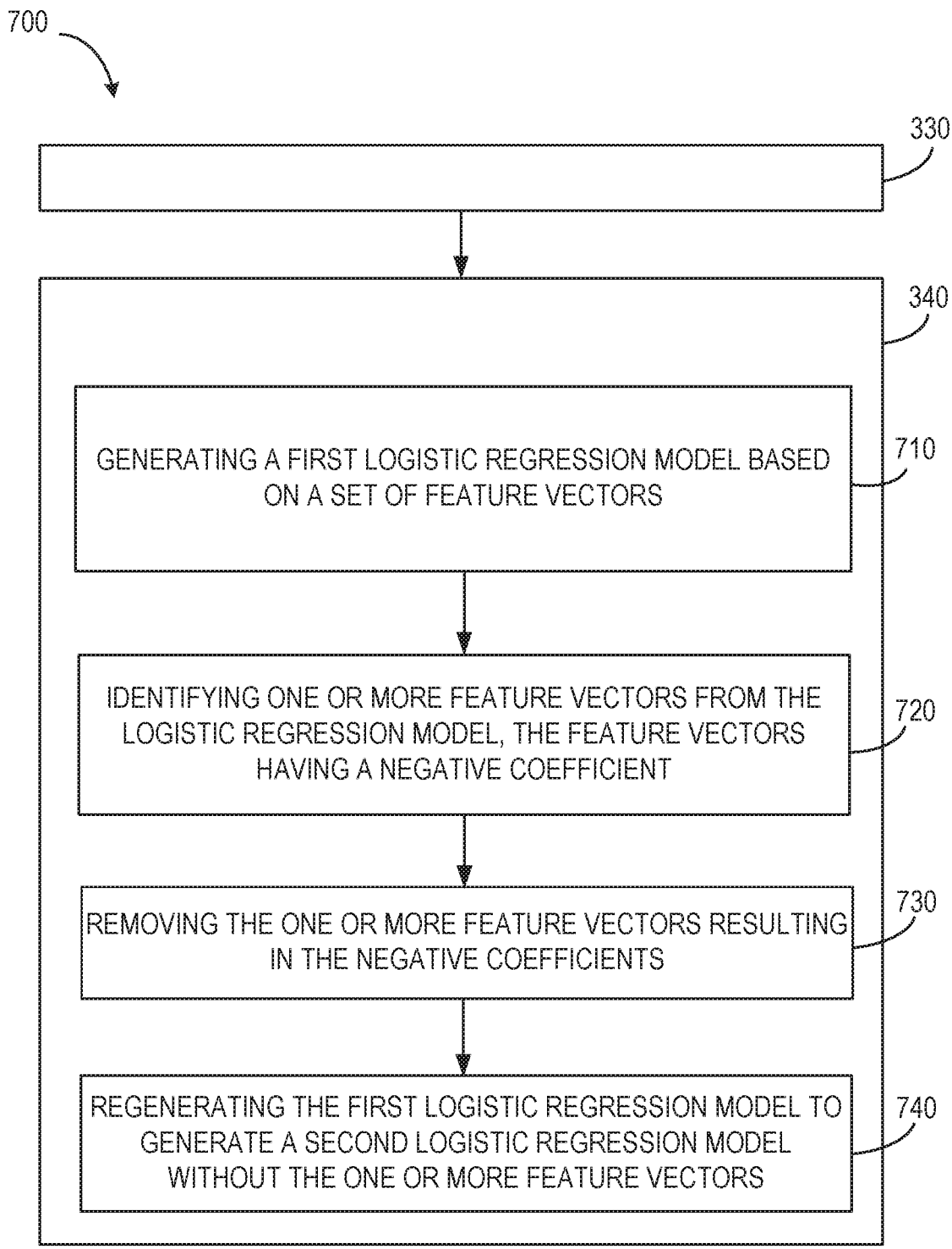
FIG. 7 is a flow diagram illustrating an example method of generating a behavioral index model, according to some embodiments of the present disclosure.

FIG. 7 is a flow diagram illustrating an example method 700 of developing a behavioral index model, consistent with various embodiments described herein. In some embodiments, the method 700 comprises a set of operations representing a feature shrinking algorithm or method. The method 700 may be performed, at least in part, by, for example, the candidate selection machine 22 illustrated in FIG. 2 (or an apparatus having similar components, such as one or more client machines or application servers). In some embodiments, the method 700 includes one or more operations from the method 300. In some instances, the method 700 is performed as a sub-operation or other part of operation 340.

In some instances, performance of method 700 generates positive weights (e.g., $W_i$) for feature vectors or feature vector examples. The method 700 may generate or achieve the positive weights while maintaining classification precision and recall of the methods described herein without significant changes. In some instances, input to the method 700 includes a specified list of performance measures. Such performance measures may include a number of remaining clauses in a model, a test copy of an inverted index, and a test set. The number of remaining clauses in the model may translate to a parameter for performance guarantees of the behavioral index model (e.g., a learned query model) in production runtime (e.g., operation within a production environment). In such instances, as a number of clauses grows, runtime for a query may also grow. The test copy of the inverted index may be used to measure performance of the behavioral index model. For example, the test copy of the inverted index may be used to measure execution time of the behavioral index model on the prepared set of queries. The test set may be used to measure one or more of precision and recall of the behavioral index model on the specified test set.

In operation 710, the model component 240 generates a first logistic regression model based on the set of feature vectors. In some embodiments, the model component 240 trains the first logistic regression model as described above with respect to one or more of methods 300, 400, 500, and 600. In such embodiments, the first logistic regression model is a first instance of the behavioral index model. The first instance of the behavioral index model may be generated as described above with respect to operation 340. In some instances, the model component 240 generates the first logistic regression model using a gradient descent algorithm.

In operation 720, the feature component 230 identifies one or more feature vectors from the logistic regression model. Each feature vector of the identified one or more feature vectors results in a negative coefficient in the logistic regression model. In some embodiments, the feature component 230 identifies the one or more feature vectors by using a feature vector as at least a portion of input to the first logistic regression model (e.g., the behavior index model). The feature component 230 receives a result provided by the feature vector used as a model input. Upon receiving the result, the feature component 230 parses the result to identify at least one negative coefficient in the first logistic regression model. After identifying the at least one negative coefficient for the feature vector, the feature component 230 may repeat operation 720 to identify additional feature vectors producing negative coefficients. In some instances, the feature component 230 performs operation 720 with respect to each feature vector of a set of feature vectors, such as the set of feature vectors generated in operation 330.

In operation 730, the model component 240 removes the one or more feature vectors resulting in the negative coefficients. In embodiments where the one or more feature vectors identified in operation 720 are included in the set of feature vectors generated from the set of training data, the model component 240 removes the one or more feature vectors (e.g., feature vectors resulting in negative coefficients) from the set of feature vectors to generate a modified set of feature vectors. In some embodiments, the model component 240 removes feature vectors having coefficients smaller than a threshold value, even where the coefficient is positive.

In operation 740, the model component 240 regenerates the first logistic regression model to generate a second logistic regression model. The second logistic regression model is generated without the one or more feature vectors identified as producing a negative coefficient. In some embodiments, the model component 240 generates the second logistic regression model using the modified set of feature vectors. The model component 240 may generate the second logistic regression model as a second instance of the behavior index model. In these instances, the model component 240 generates a second instance of the behavior index model in a manner similar to or the same as the manner described above in operation 340, using the modified set of feature vectors as input. In some instances, the model component 240 generates the second logistic regression model using a gradient descent algorithm.

In some example embodiments, the model component 240 repeats one or more of the operations 720-740 within the method 700. In such embodiments, the model component 240 regenerates one or more subsequent logistic regression models (e.g., one or more subsequent instances of behavioral index models) without one or more feature vectors associated with negative coefficients of a previous logistic regression model (e.g., a previous instance of a behavioral index model). The model component 240 may regenerate models until each final feature vector of a modified set of final feature vectors of the subsequent logistic regression model is associated with a positive coefficient within a WAND query. In some instances, the model component 240 repeats one or more of operations 720-740 until a subsequent logistic regression model or subsequent behavioral index model achieves a balance in terms of performance and runtime, as indicated in the list of specified performance measures, referenced above.

Although described with respect to repetition of operations based on coefficient values, the model component 240 may repeat one or more of the operations 720-740 until one or more constraints or characteristics are satisfied. In some embodiments, the model component 240 applies a set of boundary constraints. Application of the set of boundary constraints may result in performance of a boundary constraint algorithm. In some instances, the model component 240 performs the boundary constraint algorithm in addition to the feature shrinking algorithm, described above.

In some embodiments, the model component 240 applies the boundary constraint algorithm during a training procedure for generating one or more of the models described above, such as the first logistic regression model, the second logistic regression model, the first instance of the behavioral index model, or the second instance of the behavior index model. The model component 240 may perform the boundary constraint algorithm in using one or more operations.

In some embodiments, the model component 240 performs a gradient descent operation of the training algorithm. In performing the gradient descent operation, the model component 240 may apply one or more boundary conditions or constraints during training of the model. In applying boundary conditions or constraints, the model component 240 may move coefficients to a configured constraint boundary. For example, application of a boundary condition may assign negative coefficients to zero. After application of the boundary condition or constraint, the model component 240 may continue training the model. The model component 240 may then verify convergence of the training algorithm and the boundary constraint algorithm. Upon determination of convergence, the model component 240 may terminate the boundary constraint algorithm.

In some instances, movement of coefficients to a configured constrained boundary may be represented by Equation 4, below.

$$W_i = W_i - \alpha * (h_w(x^{(j)}) - y^j) * x_i^{(j)}; j = \overline{0, M} \; ;$$

if ($W_i$<0 after gradient descent update) then assign
$W_i$=0          Equation 4

As shown in Equation 4, N is a number of training examples, $W_i$ is an i'th component of a vector W, $x^{(j)}$ comprises features of a j'th training example, $x_i^{(j)}$ is an i'th component of the feature vector $x^{(j)}$, $y^j$ is a label for the j'th training example, and a is a learning rate of the machine learning algorithm generating the model.

Figure 8:
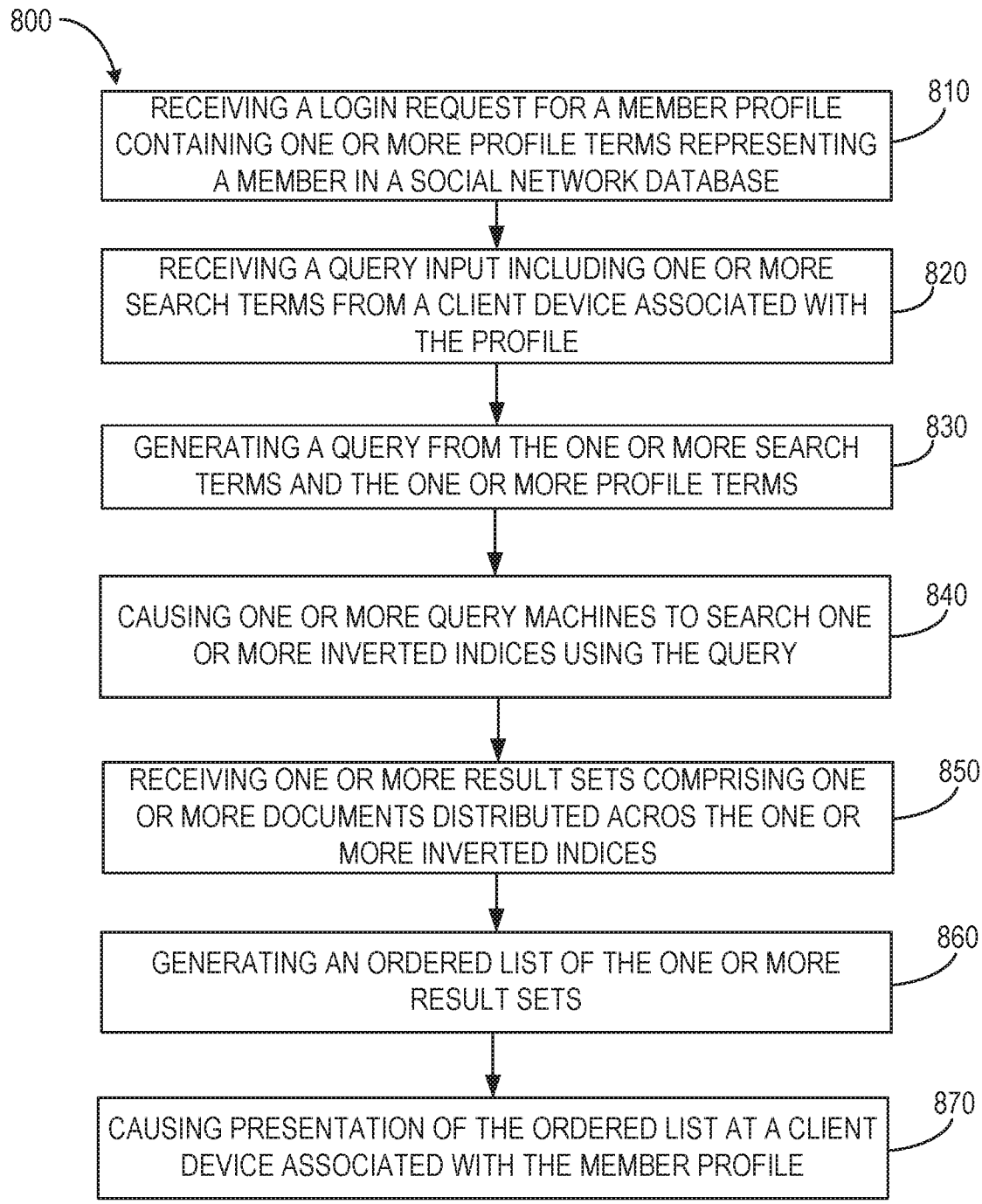
FIG. 8 is a flow diagram illustrating an example method of identifying and retrieving structured result sets from a behavioral index model, according to some embodiments of the present disclosure.

FIG. 8 is a flow diagram illustrating an example method 800 of identifying and retrieving structured result sets from a behavioral index model, consistent with various embodiments described herein. The method 800 may be performed, at least in part, by, for example, the candidate selection machine 22 illustrated in FIG. 2 (or an apparatus having similar components or operative programming, such as one or more client machines or application servers). In some embodiments, the method 800 generates a weighted OR (WOR) query. The WOR query may enable constraint extraction of documents (e.g., target data) from an inverted index. In some instances, the method 800 generates a WAND query.

In some embodiments, the inverted index contains a representation of the target data (e.g., job postings) serving as a potential pool from which a query identifies results. In such embodiments, where a pool of results is a set of jobs in a job database, the job database may be represented as a structured inverted index. For each field of a job and each word of the fields contained in the structured inverted index, the index contains a sorted list of unique job identifiers that contain this word in the indicated job's field. For example, as shown in Table 1 below, using an inverted index, the methods and systems of the present disclosure can find documents that contain the word "Software" in the field "Job Title" and the skill "Java" in the field "Skills" at the same time by intersecting respective sorted lists of document identifiers of a "Software" list and a "Java" list.

TABLE 1

| Field: Word | Job identifiers sorted list |
| --- | --- |
| Job Title: Software | 1, 2, 3, 4, 5, . . . |
| Job Title: Developer | 1, 2, 3, 4, 5, . . . |
| Skills: Java | 3, 5, 10, 11, 15, . . . |
| Skills: C++ | 2, 5, 10, 20, 50, . . . |
| Seniority: Staff | 5, 10, 15, 24, 100, . . . |
| Seniority: Senior | 2, 5, 10, 50, 105, . . . |

In operation 810, the access component 210 receives a login request for a member profile containing one or more profile terms representing a member within a social network database (e.g., database 18). The login request may associate a client device (e.g., client device 8) with the member profile. In some instances, the login request temporarily associates the client device and the member profile for the course of a session. Upon logging or timing out, in such embodiments, the member profile and the client device are no longer associated.

In operation 820, the access component 210 receives a query input including one or more search terms from a client device at least temporarily associated with the member profile. The one or more search terms may be entered into a graphical user interface presented at the client device. In some embodiments, the user interface presents a structured interface, to structure queries and identify relationships between keywords or between keywords and categories or fields provided by the user interface.

In operation 830, the query component 260 generates a query from the one or more search terms and the one or more profile terms. In some embodiments, the query is a constrained sum of elements with a positive threshold. In some instances, the query may be a constrained sum of elements with a positive threshold and one or more positive coefficients. In some embodiments, the query, having a positive threshold and positive coefficients, is represented by Equation 5 below.

$$\sum_{i=0}^{N} W_i * C_i \geq \text{threshold}; W_i > 0; i = \overline{1, N} \quad \text{Equation 5}$$

In Equation 5, $W_i$ is a positive weight of the clause in the sum and $C_i$ is an i'th clause in the sum. In some embodiments, $C_i$ is a binary variable having a value of either zero or one and N is a number of elements in the sum.

In some embodiments, using WAND queries supports constraint extraction of documents. The query component 260, constructing the WAND or WOR query, may rely on weights learned for the behavioral index model generated by the model component 240. As described above, one or more of the components of the candidate selection machine 22 construct and learn weights of queries (e.g., WAND or WOR queries) using one or more machine learning processes.

As represented by Equation 5, a query may match a document, target data source, or portion of target data when a set number of terms are matched. The set number of terms may be determined using the threshold (e.g., the positive threshold). For example where two matching terms is the positive threshold, a query may match a document when at least two out of three or more terms are matched. By way of further example, where two matching terms are a threshold (e.g., "1%" equaling an individual weight of the clause) for a query searching for job recommendations using skills as the keywords, a document satisfies the query where either all skills are present, two skills weighted at one percent are present, or a single skill at two percent is present. In a query including terms "pig," "java," and "scala" at varying weights, for instance, the query may be satisfied by "skill: pig % 1 skill: java % 1 skill: scala % 2."

Although described as generating the query using one or more of the search terms, in some embodiments, the query component 260 generates the query from a combination of the one or more search terms and a portion of source data. In such embodiments, the source data is information selected or extracted from the member profile associated with the query. For example, the query component 260 may incorporate one or more of a member's job title, one or more skills, or a member's current job position description, from the member's profile, into the query.

In operation 840, the query component 260 causes one or more query machines to search one or more inverted indices using the query. Each query machine searches at least one inverted index associated with the query machine. Each inverted index of the one or more inverted indices may contain an independent set of documents.

In some embodiments, the one or more query machines comprise a distributed system of computer nodes. The distributed system of computer nodes support one or more recommendation services. The one or more inverted indices may be one or more inverted indices of candidates or candidate documents, representing target data (e.g., job postings or job documents). In some instances, the one or more inverted indices are distributed into independent sets of nodes. Each node may handle (e.g., search result retrieval responsive to a query) the candidate selection query in parallel.

In some embodiments, upon creation of the query, the query component 260 or a search broker may pass the query to the distributed system of computer nodes. Each node provides access to, or searches, a portion of an independent set of documents. The nodes may execute the query on an inverted index partition (e.g., the independent set of documents) to which the node has access. Each node may select one or more documents based on the query (e.g., the WAND query). The documents selected may be included in a result provided to the query component 260 by each respective node. For example, where a sum of clauses of the query for a document is greater than a preconfigured threshold for the query, the document may be included in a result set. In such an instance, the threshold indicates a number of query clauses to be matched to the contents of a document for the document to be included in a result of a node. A representation of such an instance may be found in Equation 5.

In some instances, in causing the one or more query machines to search the at least one inverted index, the query component 260 makes a call to a backend retrieval functionality of the candidate selection machine 22. The backend retrieval functionality (e.g., a search broker) passes the request or call to the one or more query machines. In instances using a search broker, the search broker may facilitate communication between an application receiving the one or more search terms and the query component 260, which forms the query in operation 830. The search broker may then pass the query to search partitions (e.g., the one or more query machines). Each partition may hold an independent set of documents and contain representations of the documents as inverted indices. Each query machine may execute the query, in parallel, on an associated inverted index which the query machine holds.

In operation 850, the access component 210 receives one or more result sets comprising one or more documents distributed across the one or more inverted indices. In some embodiments, the one or more result sets include documents (e.g., target data) having values for a sum of the conjunctional clauses in excess of a sum of the positive threshold for the query.

In operation 860, the ordering component 270 generates an ordered list of the one or more result sets. In some embodiments, the ordering component 270 generates the ordered list of the one or more result sets using a second pass scoring component. The second pass scoring component prepares a list of documents according to a sorting scheme based on a number of query clauses matching each document, such that documents matching a higher number of query clauses are placed in a higher position than documents matching a lower number of query clauses.

The ordering component 270 may generate the ordered list of the one or more result sets such that the ordered list comprises an ordered list corresponding to each result set of the one or more result sets. In some embodiments, the ordered list is generated as a single ordered list, such that individual results of each of the one or more result sets are incorporated into the ordered list, without regard to the result set or query machine in which the result originated. In embodiments incorporating a search broker, the search broker may generate the ordered list and return the ordered list to the application that received the one or more search terms or a component of the candidate selection machine 22.

Where the ordering component 270 generates a single ordered list from the one or more result sets, the ordering component 270 may aggregate independent sets of scored documents from one or more search nodes into the sorted and ordered list. After aggregating the documents, the ordering component 270 may pass the ordered list to the presentation component 280.

In operation 870, the presentation component 280 causes presentation of the ordered list at a client device associated with the member profile within a user interface presenting at least a portion of the member profile. The presentation component 280 may cause presentation of the ordered list within a user interface presented on a display device at the client device. In some embodiments, the presentation component 280 may cause presentation of portions of the ordered list, divided among a plurality of pages.

Figure 9:
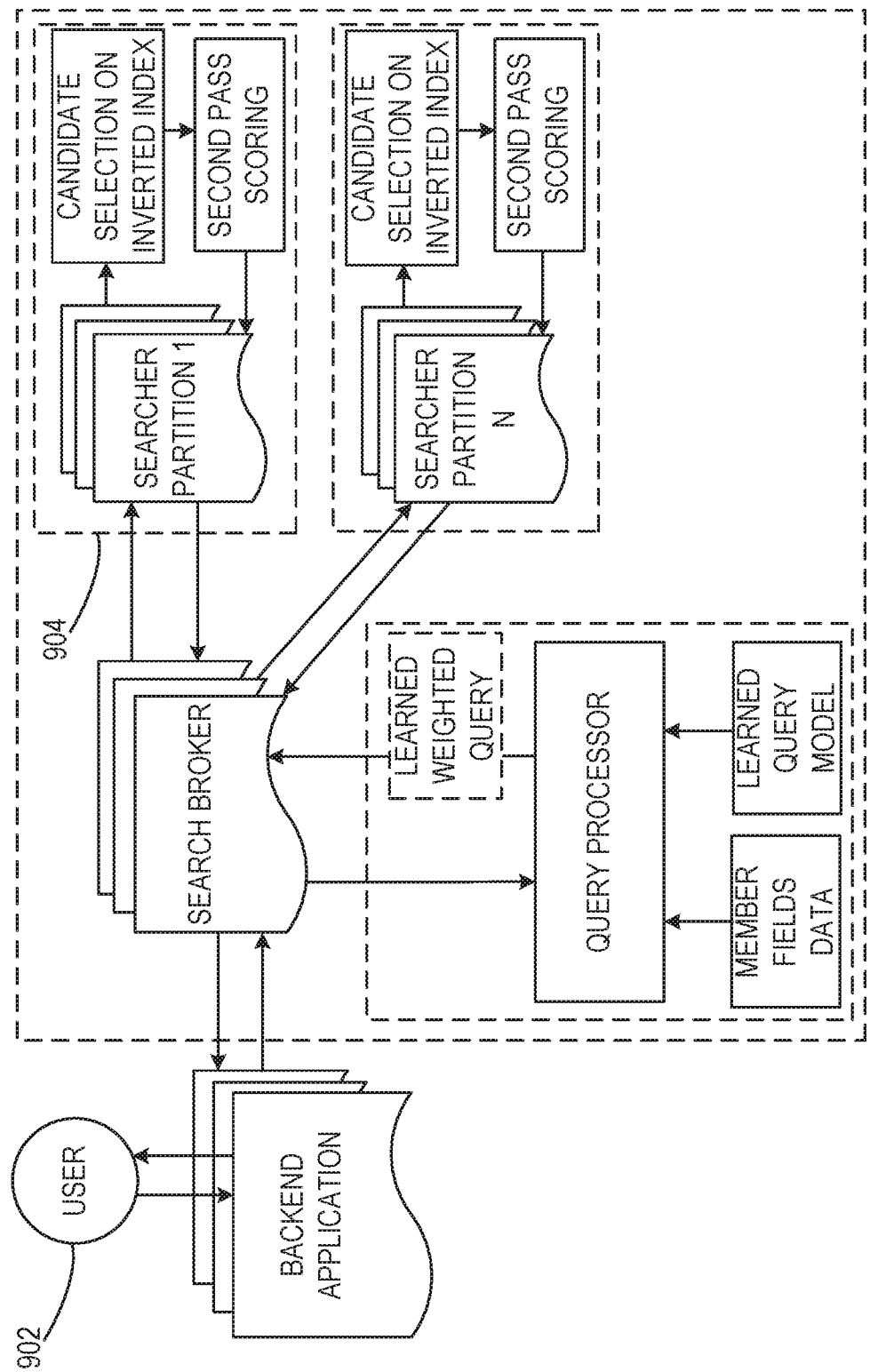
FIG. 9 is a flow diagram illustrating an example method of identifying and retrieving structured result sets from a behavioral index model, according to some embodiments of the present disclosure.

An example schema for flow of the query process is shown in FIG. 9, and described below. In FIG. 9, the overall process of applying learned candidate selection queries (e.g., the query generated using a behavioral index model) to the one or more inverted indices and producing a resulting sorted list of documents that answer the informational request (e.g., the query) is shown as an information flow between a user 902, portions of the candidate selection machine 22, and the one or more query machines 904. In some embodiments, the one or more query machines 904 form a part of the candidate selection machine 22.

In some embodiments, as shown in FIG. 9, when a member visits a website associated with the candidate selection machine 22, or a mobile application associated therewith, the client device may open the member's front-end application to make a call to a back-end server associated with one or more of the social networking system 10 and the candidate selection machine 22. The back-end server may retrieve relevant documents from a search system (e.g., the candidate selection machine and the one or more query machines 904), as described in operations 810-830. The back-end server application may pass a request from the member to the search broker.

The search broker may prepare the query and distribute the query to search nodes (e.g., the one or more query machines 904). The search broker may call or otherwise contact or access a query processor (e.g., the query component 260) to form a query using member field data. In some instances, as described above, the query processor performs one or more operations of the query component 260. The query processor may select a representative machine learned query configuration depending on the informational request of the member. In some embodiments, the query processor uses the member's field data to form a query according to the behavioral index model, described above. According to the behavioral index model configuration, the query processor assembles tuples of the member fields of the member associated with the request. The query processor may assemble the tuples from member fields which are not empty (e.g., contain member profile data). The query processor may then add the tuples into clauses of the query using one or more processes described herein.

Figure 10:
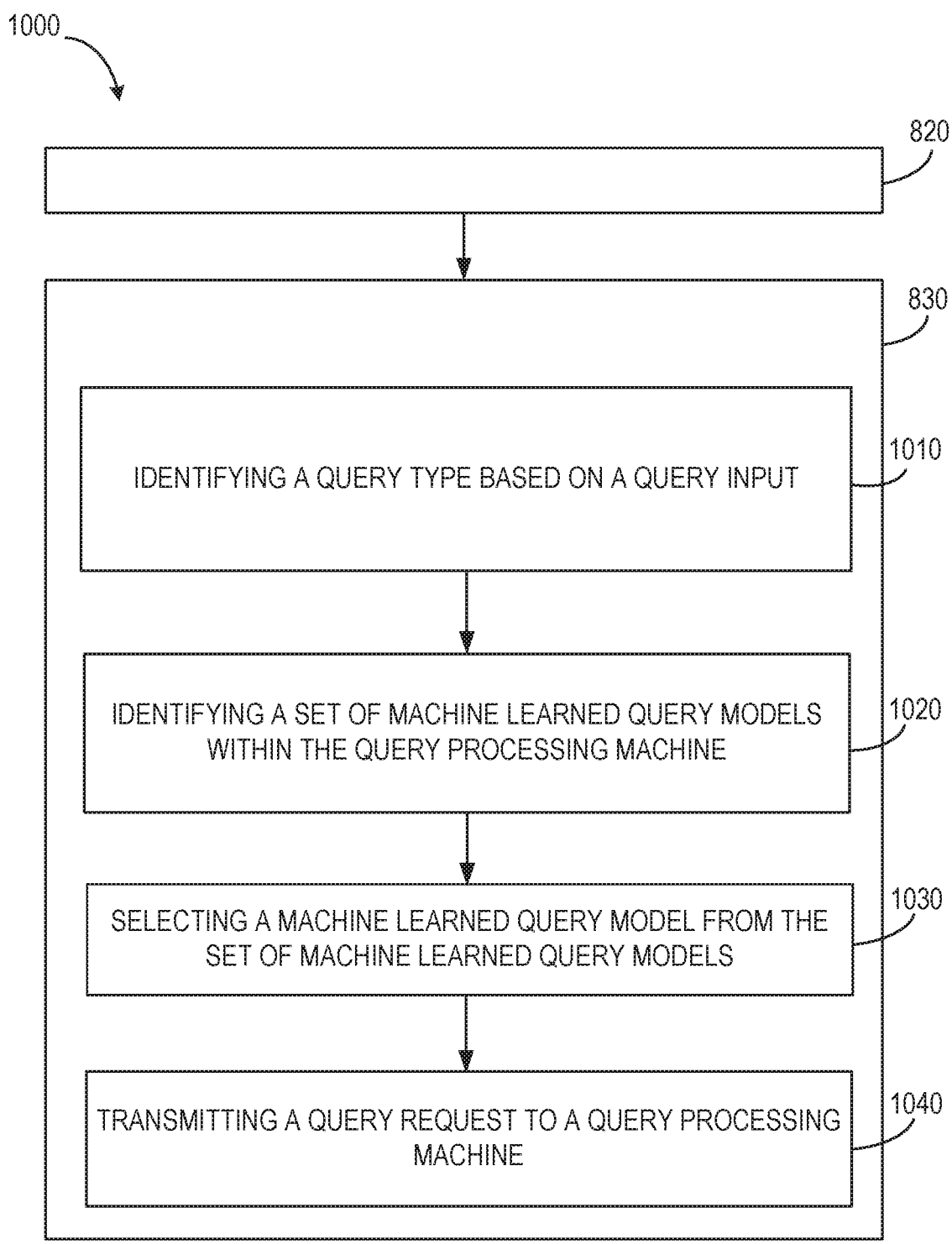
FIG. 10 is a flow diagram illustrating an example method of identifying and retrieving structured result sets from a behavioral index model, according to some embodiments of the present disclosure.

FIG. 10 is a flow diagram illustrating an example method of identifying and retrieving structured result sets from a behavioral index model, consistent with various embodiments described herein. The method 1000 may be performed, at least in part, by, for example, the candidate selection machine 22 illustrated in FIG. 2 (or an apparatus having similar components, such as one or more client machines or application servers). In some embodiments, the method 1000 includes one or more operations from the method 800. In some instances, the method 1000 is performed as a sub-operation or other part of operation 830.

In operation 1010, the query component 260 identifies a query type based on the query input. In some embodiments, the query component 260 identifies the query type by parsing the one or more search terms received for generating the query. The query component 260 determines one or more characteristics of the one or more search terms and determines the query type as a query type of a set of query types. The identified query type is associated with the one or more characteristics. In some instances, query types may include job searches, member searches, document or publication searches, social network connection searches, combinations thereof, or any other suitable query type.

In operation 1020, the query component 260 identifies a set of machine learned query models within the query processing machine. In some embodiments, the query component 260 identifies the set of machine learned query models (e.g., one or more discrete behavioral index models) based on an association between each machine learned query model with a query type. In such embodiments, the query component 260 accesses a repository or database comprising the set of machine learned query models. Each machine learned query model, stored in the repository, is associated with one or more query types, with the association being stored in the repository.

In operation 1030, the query component 260 selects a machine learned query model from the set of machine learned query models based on the query type. The machine learned query model may define conjunctional clauses of a template query. In some embodiments, to select the machine learned query model, the query component 260 parses the query types within the repository to match the query type of a machine learned query model, in the repository, with the query type received in operation 1010. Upon identifying the query type within the repository that matches the query type received in operation 1010, the query component 260 selects the machine learned query model associated with the matched query type. In some embodiments, a plurality of machine learned query models are associated with a single query type. In such embodiments, the query component 260 may select from among the plurality of machine learned query models based on the one or more search terms, the one or more of the characteristics of the search terms, a match of a secondary query type, or any other suitable selection criterion or criteria.

In operation 1040, the query component 260 transmits a query request to a query processing machine (e.g., the search broker, one or more search nodes, or one or more query machines). In some embodiments, the query request includes the query input and the query type. The query request causes the query processing machine to generate the query used to search against the one or more inverted indices. In some instances, the query request includes an indication of the machine learned query model selected in operation 1030. In some instances, the query request includes the query input, the query type, and an indication of the selected machine learned query model. In some embodiments, the query request includes one or more of the query input, the query type, an indication of the selected machine learned query model, and one or more portions of member profile data. The member profile data may be selected from the member profile from which the query input was received. In some instances, the one or more portions of the member profile data are selected and included in the query request in a manner similar to or the same as described above with respect to some embodiments of operation 830.

In some embodiments, in generating the query, where the query component 260 has selected one or more machine learned query models, the query component 260 may generate a query from the selected machine learned query model and member source data, received as input. The query component 260 may construct the query comprising a plurality of query clauses. For each query clause in the machine learned query model, the query component 260 may execute one or more operations for including tuple information into the clause. Once information from a tuple is populated into a query clause, the populated query clause is added to the query for the machine learned query model.

In some embodiments, the above-referenced operations of the query component 260 may be represented using a set of pseudocode operations, shown below.

```
INPUT:
    Machine learned query model (depends on the informational need)
    Member's source data (depends on the informational need)
CONSTRUCT Query
    FOREACH (Clause IN "LEARNED QUERY configuration")
    BEGIN
        FOREACH(Tuple IN Clause of "LEARNED QUERY configuration") BEGIN
            IF (member field for this Tuple is not empty) THEN
            fill in data for Tuple and add it to Clause
            END
        IF(Clause contains data for all configured tuples) THEN Add clause to the query
    END
```

Figure 11:
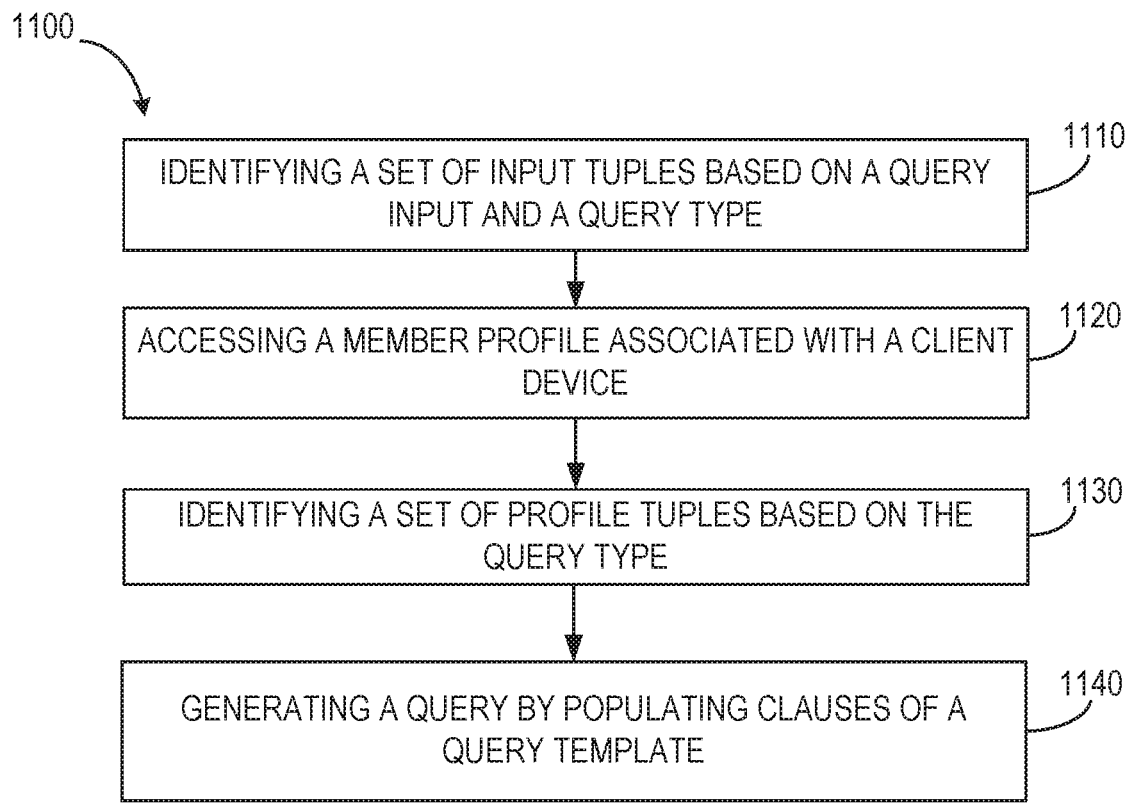
FIG. 11 is a flow diagram illustrating an example method of identifying and retrieving structured result sets from a behavioral index model, according to some embodiments of the present disclosure.

FIG. 11 is a flow diagram illustrating an example method of identifying and retrieving structured result sets from a behavioral index model, consistent with various embodiments described herein. The method 1100 may be performed, at least in part, by, for example, the candidate selection machine 22 illustrated in FIG. 2 (or an apparatus having similar components, such as one or more client machines or application servers). In some embodiments, the method 1100 includes one or more operations from the methods 800 or 1000.

In operation 1110, the query component 260 identifies a set of input tuples based on the query input and the query type. The set of input tuples may include data in a title field and an input field. In some embodiments, the set of input tuples are identified in response to selecting the machine learned query model, described above. In some instances, the tuples may comprise information similar to the information described above. For example, the tuples may be identified as including an identifier, a label, and a feature vector, as described above. The tuples may be configured to receive information associated with one or more of the query input and the query type.

In operation 1120, the query component 260 accesses the member profile associated with the client device from which the query input was received. The query component 260 may access the member profile in response to one or more of identifying the set of input tuples, receiving the query input, or identifying the query type.

In operation 1130, the query component 260 identifies a set of profile tuples based on the query type. The set of profile tuples may include data in a title field and an input field. In some embodiments, the set of profile tuples include information selected from the member profile. The information may be selected from one or more fields within the member profile which contain one or more portions of information. In some instances, the member profile information selected for inclusion in the set of profile tuples is associated with one or more characteristics of at least one of the query input and the query type.

In operation 1140, the query component 260 generates the query by populating clauses of a query template. In some embodiments, the query component 260 populates clauses of the template query with data of the set of input tuples. The query component 260 may populate the clauses of the template query with data of the set of profile tuples. In some instances, the query component 260 populates the clauses of the template query with data from both the set of input tuples and the set of profile tuples. For example, the query component 260 may populate the clauses of the template query with information from one or more of the set of input tuples and the set of profile tuples or with information from a combination of the set of input tuples and the set of profile tuples.

Figure 12:
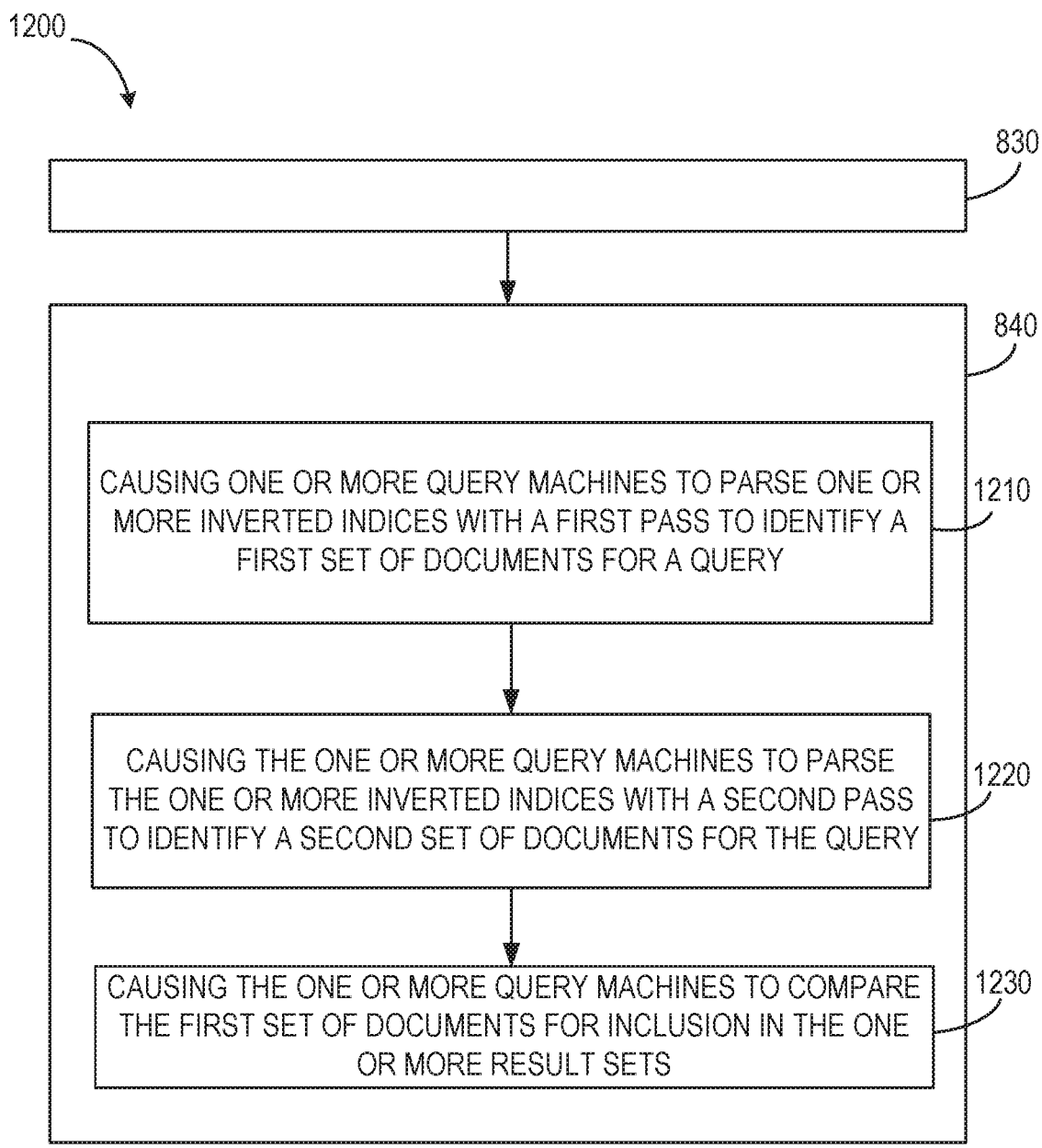
FIG. 12 is a flow diagram illustrating an example method of identifying and retrieving structured result sets from a behavioral index model, according to some embodiments of the present disclosure.

FIG. 12 is a flow diagram illustrating an example method of identifying and retrieving structured result sets from a behavioral index model, consistent with various embodiments described herein. The method 1200 may be performed, at least in part, by, for example, the candidate selection machine 22 illustrated in FIG. 2 (or an apparatus having similar components, such as one or more client machines or application servers). In some embodiments, the method 1100 includes one or more operations from the methods 800, 1000, or 1100. For example, in some instances, the method 1200 may be performed as a set of sub-operations making up at least a portion of the operation 840.

In operation 1210, the query component 260 causes the one or more query machines to parse the one or more inverted indices with a first pass to identify a first set of documents for the query. The first pass may exclude conjunctions between the clauses within the query. In some embodiments, each query machine of the one or more query machines parses an inverted index associated with the query machine. In some instances, each query machine is precluded from parsing an inverted index associated with another query machine of the one or more query machines.

In operation 1220, the query component 260 causes the one or more query machines to parse the one or more inverted indices with a second pass to identify a second set of documents for the query. The second pass includes conjunctions between clauses within the query. In some instances, the second pass is performed on the first set of documents identified in operation 1110. In some embodiments, each query machine of the one or more query machines parses an inverted index associated with the query machine and does not parse an inverted index associated with another query machine of the one or more query machines.

In operation 1230, the query component 260 causes the one or more query machines to compare the first set of documents and the second set of documents to identify one or more documents for inclusion in the one or more result sets. In some instances, each query machine performs a comparison of a first set of documents and a second set of documents identified by that query machine. Documents identified for inclusion in the one or more result sets may comprise documents matching a number of query clauses that is greater than a predetermined threshold. In some instances, the documents selected for inclusion match at least a set of specified query clauses. In such instances, one or more query clauses may indicate relevance, importance, or any other suitable characteristic.

The above-described systems and methods may be evaluated for building and executing candidate selection query models. In some instances, latency of the query execution may be measured in an online setting. Latency may be measured in real-time or near real-time and may be used to initiate training or re-training of one or more of the machine learned models, described above. The latency may be evaluated with respect to the inverted index of structured documents (e.g., job postings) depending on different recall considerations, different index sizes, and with and without proposed candidate selection.

In some instances, candidate selection quality results may be evaluated using a receiver operating characteristic (ROC) curve with varying thresholds and a precision/recall area under the curve (PR AUC). Such an evaluation may also include online A/B testing. The evaluation may also consider varying training data on the performance of the candidate selection models. Because WAND queries may employ positive weights, the evaluation may present comparison of models trained with and without features with negative weights. Performance tuning may also be evaluated. Such evaluations techniques may be employed automatically by the candidate selection machine 22 to initiate training or re-training of models. In some instances, automated evaluations are performed on a rolling basis, periodically, in response to specified events or performance characteristics, or any other suitable metric.

In some embodiments, evaluation techniques include internally implemented machine learning platforms based on Spark and Hadoop infrastructure. In some instances, search infrastructure is based on an internal search engine for the social networking system 10. The internal search engine may support implementation of the WAND query. Data in the inverted index may be represented in a structured way. In these embodiments, one or more keywords from the structured document (e.g., a job posting) may be associated with a field of the document or a subject represented by the document (e.g., a job). For example, the word "software" from the Title field of the job posting may have a list of document identifiers that contain this word in the Title field.

One or more tracking operations may be performed on structured documents. Tracking may include identifying behavior of member interactions with the social networking system logged by one or more server of the social networking system. In some embodiments, tracking data may include impression tracking to identify whether a structured document was presented to a particular member. The tracking data may also include view tracking to identify whether a member clicked on the structured document or title of the structured document to view details included therein. In some instances, tracking data includes applications tracking to identify whether a member took action with respect to the structured document (e.g., applied for the job).

In evaluating the models generated by the methods and systems described herein, internal online performance monitoring tools of the social networking system 10 may be employed. The internal monitoring tools may measure latency metrics (e.g., how fast search queries were processed by the candidate selection machine 22) where candidate selection query models were used to retrieve information from the structured inverted index.

In some instances, to measure the quality of the candidate selection machine 22 or models generated by the candidate selection machine 22, evaluation techniques include using ROC curves. The ROC curves may be a graphical plot that shows performance of the classifier depending on a selected threshold. An ROC curve may be plotted using a true-positive rate and a false-positive rate depending on the threshold settings for the classifier.

In some instances, candidate selection models are trained offline using data points identified within the tracking data. The offline data set may be separated into three subsets. The three subsets may include a training set, a validation set, and a test set. The training set may be used to train the model using the "feature shrinking" method described above. In some embodiments, the training set may also use applied L2 regularization to prevent over-fitting of the model. A theoretical best model may be selected on the validation set and used to report metrics on the test set.

In some embodiments, online validation is performed on trained candidate selection models on a subset of production traffic of the social networking system 10. In such embodiments, the subset of production traffic includes a random or pseudorandom subset of members using an A/B testing platform of the social networking system 10. A/B testing may be used to compare two versions of the approaches. In some instances, different candidate selection query models may be included in each version of the approaches and may be applied at the same time on two randomly assigned groups of similar members of the social networking system. As result of A/B tests, evaluation may be performed in online settings. The evaluation may identify which approach of candidate selection models showed increased interaction with the structured documents such as job applications and job view rates.

Figure 13:
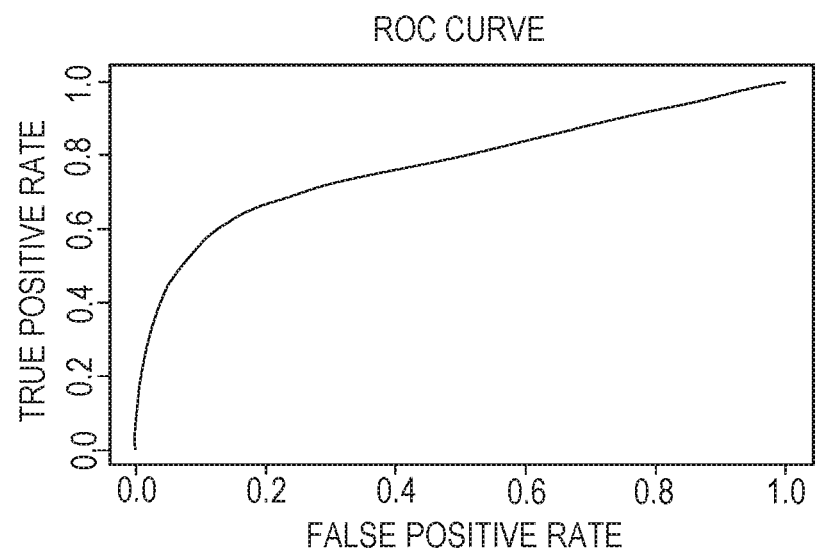
FIG. 13 is a receiver operating characteristic curve for a candidate selection model, according to some embodiments of the present disclosure.

As described above, the performance of learned candidate selection may be evaluated in offline and online settings. FIG. 13 represents an embodiment of an ROC curve. Comparable results may be identified within the A/B testing performance with and without a candidate selection model. The testing performance may identify lower latencies using the candidate selection model with learned candidate selection queries. In some instances, evaluation of a given candidate selection model may be tuned by manipulating candidate selection model parameters. The candidate selection model parameters may be modified depending on the member segments, described below.

The candidate selection machine 22 may generate and include a baseline model as a basis to demonstrate improvement in one or more characteristics or performance relating to the baseline model. The baseline model may use a set of keywords (e.g., each keyword) from the fields of the member profiles to identify all structured documents accessible by the social networking system 10 or the candidate selection machine 22 that contain one or more of the set of keywords. In the baseline model, keywords from a member's profile are used to construct a disjunction query to the inverted index of structured documents.

The disjunction query may employ scoring of all structured documents that contain those keywords in the fields of the structured document. For example, in the baseline query model, keywords from a "Summary" field of the member profile may be used to extract the structured documents from the inverted index of structured documents that contain those keywords in a "Description" field. The keywords may also be present in other selected fields of the structured documents. Such disjunctions of a non-candidate selection model may include, for example, (Member Summary ∩ Job Description) ∪ (Member Skills ∩ Job Skills) ∪ (Member Title ∩ Job Title).

Figure 14:
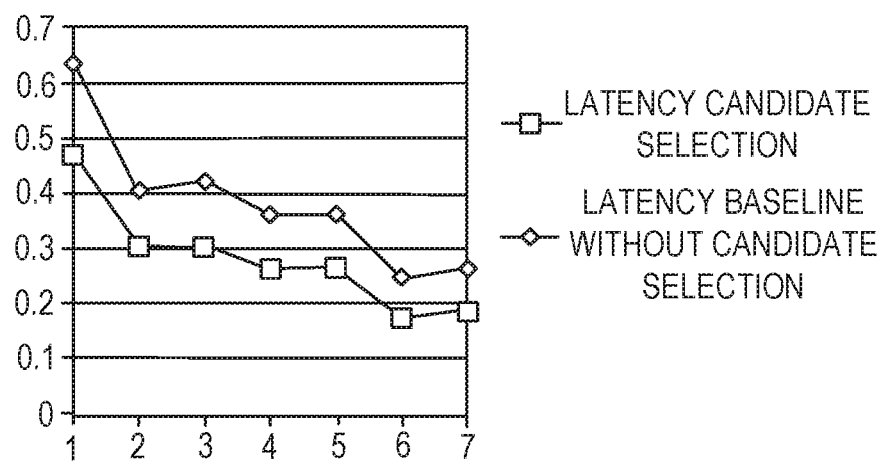
FIG. 14 is a latency comparison graph for a candidate selection model and a baseline model, according to some embodiments of the present disclosure.
Figure 15:
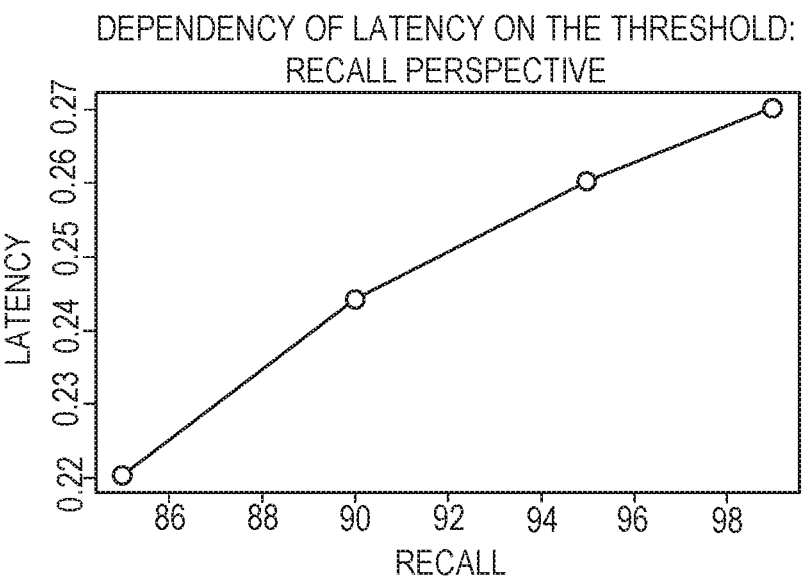
FIG. 15 is a latency comparison graph for query processing on a threshold of a candidate selection model, according to some embodiments of the present disclosure.

In some example embodiments, FIG. 14 presents a comparison of the baseline query model with a proposed learned candidate selection query model. FIG. 14 shows the comparison over a predetermined time period (e.g., a week). The comparison is based on capture performance of the model with the same traffic load for both approaches for different behavior of members during the week. As shown in FIG. 15, a 25% to 30% improvement in the latency for the proposed learned candidate selection query model is depicted in comparison to the baseline query model. The increased performance may be present without sacrificing the quality of the returned recommendations. FIG. 15 depicts 90th percentile latency values allocated to the model traffic, where traffic is higher in the beginning of the week and then lowers down on the weekend. FIG. 15 presents an example embodiment indicating that using all the features with positive and negative weights in the offline evaluation may include a performance impact in some situations, depending on parameters of the query model. Each of the fields from the member profiles used for retrieving structured documents from the inverted index, as shown in FIG. 14, may have a positive meaning. For example, a positive meaning or signal with respect to probability that a member is a fit for a job may be identified based on common words between a job description and description of the member's current position.

In some embodiments, the effect of training data may be evaluated based on inclusion of differing data. For example, in some embodiments, evaluation may be performed with random negatives and user actions on structured documents. In these instances, negative training data may be represented as random negatives, as described above. These random negatives may be structured data presented to other members of the social networking system and not shown to a current member. The positive training data and actions performed on the structured documents may be represented as all of the structured documents where a member performed any action. This training data may seek to theoretically optimize retrieval of documents that are likely to be acted upon by a member. The impressions that failed to receive an action may remain relevant and not be included in the negative training data.

Evaluation may also be performed with structured data impressions and random negatives. In these instances, negative training data may be represented as random negatives and structured documents presented to other members and not to the current member of the social networking system. The positive training data may be represented as all the structured data that were shown to the current member. The training data may evaluate a current scoring model. A current scoring model, being evaluated, may be executed on top of the candidate selection model and may be evaluated for desirability. Desirability may be determined based on structured documents that are scored higher than a threshold being passed by the candidate selection model within a presented result set. Both of the above-referenced evaluation techniques for differing training data may be used to evaluate training models, in some instances. As shown in Table 2 below, in some embodiments, the second evaluation technique may present positive results in terms of precision and recall as well as A/B testing performance.

TABLE 2

| Method | ROC AUC | PR AUC |
|---|---|---|
| Type 1: Clicks + random negatives + positive coefficients features | 0.742 | 0.927 |
| Type 2: Impressions + random negatives + positive coefficients features | 0.775 | 0.933 |
| Type 2: Impressions + random negatives + all features with positive and negative coefficients | 0.812 | 0.943 |

As referenced above, latency may be compared when evaluating candidate selection query models. The latency may be evaluated as a function of a threshold, a function of index size, and compared latency of a retrieval system with and without the proposed candidate selection query model. As shown in FIG. 15, evaluation of latency may indicate that increasing a threshold of the model causes a decrease in the latency of the online query execution. In some instances, evaluation may also indicate that a threshold increase may reduce a recall of the model, thereby affecting a quality of the returned results as shown in FIG. 15.

Figure 16:
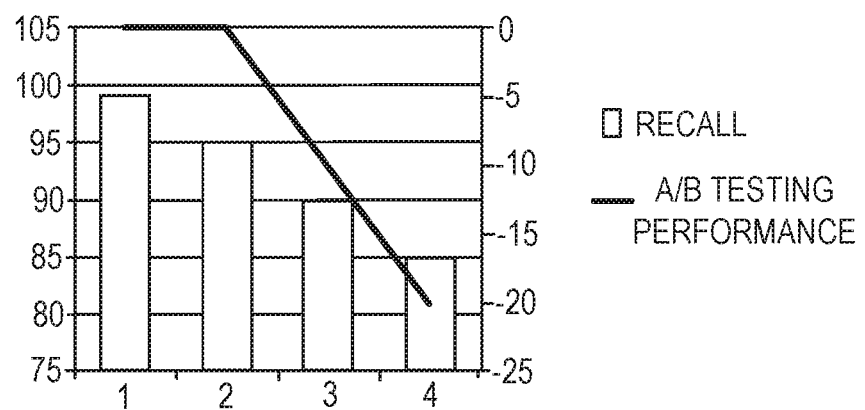
FIG. 16 is an A/B testing graph for dependence of an online quality of recall of a candidate selection model, according to some embodiments of the present disclosure.

FIG. 16 is depicted with an axis on the left representing recall and an axis on the right representing performance degradation in terms of the number of member's clicks on the structured document descriptions, such as in job recommendations. The threshold may be reduced from 99% recall to 95% recall to achieve improvement in the latency of the candidate selection query model and at the same time keep the quality of the online recommendations at the same level. In some embodiments, the candidate selection machine 22, in evaluating and selecting a machine learned model for use in result selection, balances or takes into consideration threshold levels in conjunction with recall. In such instances, the candidate selection machine 22 may select a model which reduces a query clause match threshold to retrieve recommendations at a top of a ranking list, while retrieving fewer total documents.

Figure 17:
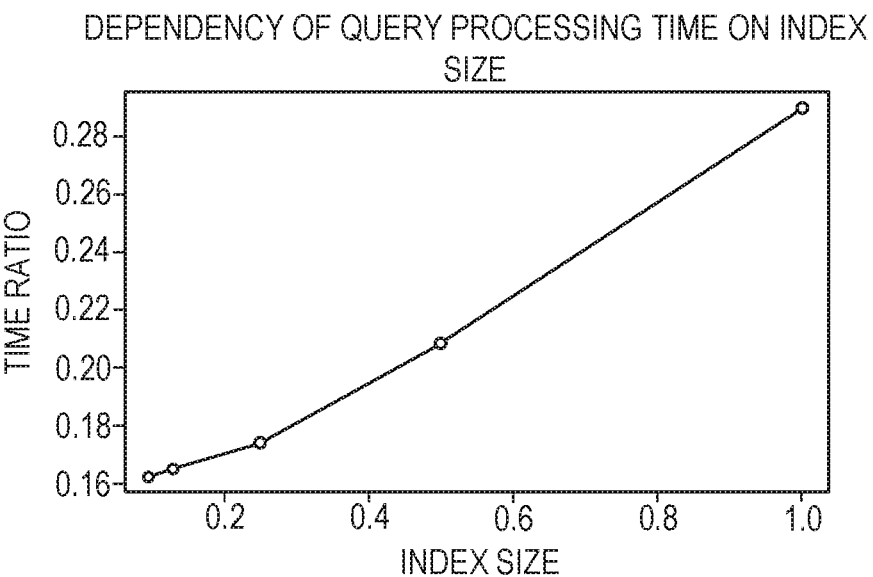
FIG. 17 is a graph depicting dependence of query processing time on an index size, according to some embodiments of the present disclosure.

In some embodiments, dependence of candidate selection models may also be evaluated based on different index sizes. In these embodiments, latency of the candidate selection model grows depending on the index size, as shown in FIG. 17. In some instances, inverted indices are stored in a distributed set of machines or across a portions of a database, logically divided or partitioned. Each machine may handle an independent set of the job documents. Therefore, growing index size can be mitigated by increasing a number of nodes that participate in the online configuration of the search system, so that smaller parts of the index are distributed across independent set of machines.

In some embodiments, the methods and systems described herein tune the candidate selection model, as described above. Requests for recommended structured documents (e.g., job recommendations) may come from active members of the social networking system 10. The active members may tend to have member profiles which include more information. Because of relative levels of profile completeness or inclusion, queries for the active members, generated by the candidate selection machine 22, may have a higher number of structured Boolean clauses with keywords in the overall query. In some embodiments, a generated query model may enable serving active members within predefined latency constraints.

Figure 18:
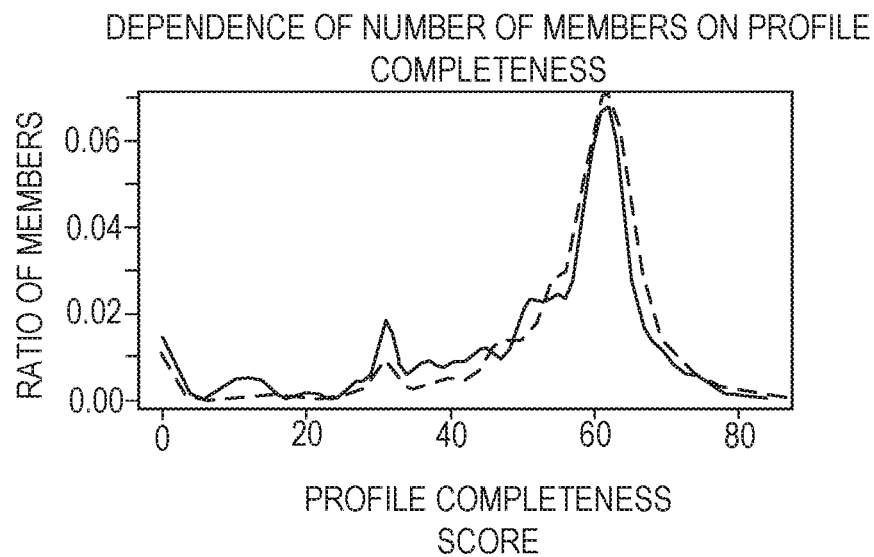
FIG. 18 is a graph depicting dependence is a graph depicting dependence of a number of members on a profile completeness score, according to some embodiments of the present disclosure.

Members of the social networking system 10 having lower profile completion may also engage the candidate selection machine 22. In such instances, a query model, generated using the methods and systems of the present disclosure, may address such cases by lowering one or more thresholds for a given candidate selection model. The methods and systems may also tune candidate selections models by training looser candidate selection models for the members with low profile completion. As shown in FIG. 18, dependence of candidate selection query model on the profile completion is represented. In FIG. 18, a horizontal axis represents low to high profile completion from left to right. A vertical axis represents a ratio of a number of members served with a full set of results. For the model trained explicitly for the users with high profile completeness, a lower number of documents may be served for the users with low profile completeness.

The methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

Figure 19:
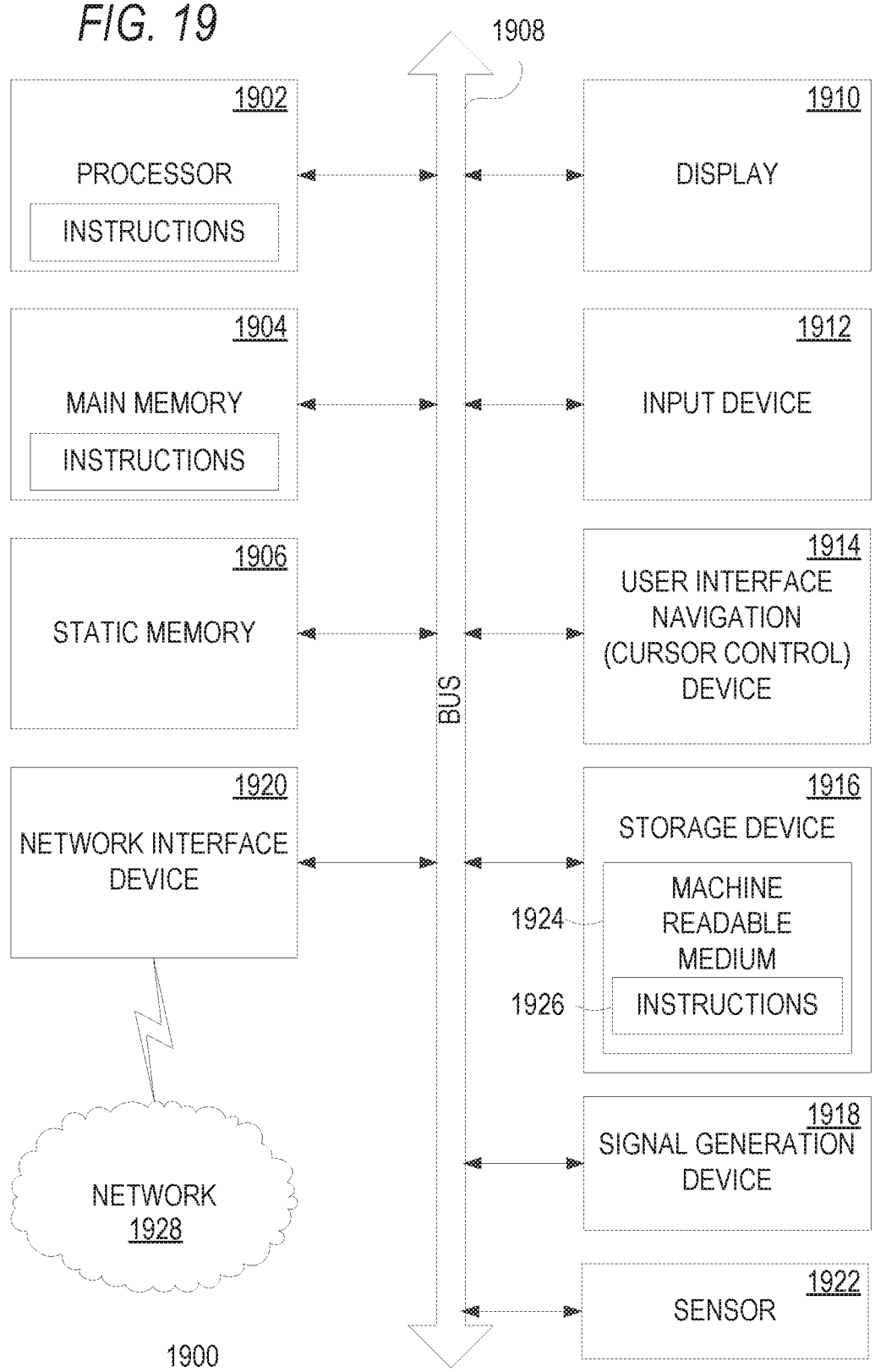
FIG. 19 is a block diagram of a machine in the form of a computing device within which a set of instructions, for causing the machine to perform any one or more of the methodologies discussed herein, may be executed.

FIG. 19 is a block diagram of a machine in the form of a computing device within which a set of instructions, for causing the machine to perform any one or more of the methodologies discussed herein, may be executed. For example, the computing device may be a server functioning as the candidate selection machine 22. In some instances the computing device may be a set of similar computing devices storing instructions capable of configuring a processor of the computing device as one or more of the modules (hardware-software implemented modules) described above. The configuration of a module, even for a period of time, causes the computing device to act as a special purpose computing device for performing one or more operations associated with the module, as described in the present disclosure. In some embodiments, the computing device may function as the social networking system 10 with portions (e.g., hardware and instructions) partitioned to function as one or more of the modules, interfaces, or systems described above during specified operations associated with those aspects of the modules, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a various embodiments, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a display unit 1910, an alphanumeric input device 1912 (e.g., a keyboard), and a user interface (UI) navigation device 1914 (e.g., a mouse). In one embodiment, the display, input device and cursor control device are a touch screen display. The computer system 1900 may additionally include a storage device 1916 (e.g., drive unit), a signal generation device 1918 (e.g., a speaker), a network interface device 1920, and one or more sensors 1922, such as a global positioning system sensor, compass, accelerometer, or other sensor.

The drive unit 1916 includes a machine-readable medium 1924 on which is stored one or more sets of instructions and data structures (e.g., software 1926) embodying or utilized by any one or more of the methodologies or functions described herein. The software 1926 (e.g. processor executable instructions) may also reside, completely or at least partially, within the main memory 1904 (e.g., non-transitory machine-readable storage medium or processor-readable storage device) and/or within the processor 1902 during execution thereof by the computer system 1900, the main memory 1904 and the processor 1902 also constituting machine-readable media.

While the machine-readable medium 1924 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices, magnetic disks such as internal hard disks and removable disks; magneto-optical disks; and CD-ROM and DVD-ROM disks.

The software 1926 may further be transmitted or received over a communications network 1928 using a transmission medium via the network interface device 1920 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:
   receiving, by one or more processors, a login request for a member profile containing one or more profile fields containing terms representing a member within a social networking database;
   receiving a request for an informational need from a client device at least temporarily associated with the member profile;
   identifying a set of machine learned query models within the query processing machine;
   selecting a machine learned query model from the set of machine learned query models based on the informational need, the machine learned query model defining conjunctional clauses of a template query, each conjunctional clause defining a tuple representing a weighted combination of a profile field and a field in target data types associated with the informational need;
   generating a query by applying the one or more profile fields to the conjunctional clauses in the selected machine learned query model, eliminating any tuples containing profile fields that have no data in the member profile;
   causing one or more query machines to search one or more inverted indices using the query, each query machine searching at least one inverted index associated with the query machine, each inverted index of the one or more inverted indices containing an independent set of documents;
   receiving one or more result sets comprising one or more documents distributed across the one or more inverted indices;
   generating an ordered list of the one or more result sets; and
   causing presentation of the ordered list at a client device associated with the member profile within a user interface presenting at least a portion of the member profile.

2. The method of claim 1, wherein generating the query further comprises:
   in response to selecting the machine learned query model, identifying a set of input tuples based on the query input and the query type, the set of input tuples including data in a title field and an input field; and
   generating the query by populating clauses of the template query, associated with the machine learned query model, with the data of the set of input tuples.

3. The method of claim 1, wherein generating the query further comprises:
   accessing the member profile associated with the client device from which the query input was received;
   identifying a set of profile tuples based on the query type, the set of profile tuples including data in a title field and an input field; and
   generating the query by populating clauses of the template query, associated with the machine learned query model, with the data of the set of profile tuples.

4. The method of claim 1, wherein the query is a constrained sum of e a positive threshold and one or more positive coefficients.

5. The method of claim 4, wherein the one or more results sets include only documents having values for a sum of the conjunctional clauses in excess of a sum of the positive threshold for the query.

6. The method of claim 1, wherein causing the one or more query machines to search the one or more inverted indices using the query further comprises:
   parsing the one or more inverted indices with a first pass to identify a first set of documents for the query, the first pass excluding conjunctions between clauses within the query;
   parsing the one or more inverted indices with a second pass to identify second set of documents for the query, the second pass including conjunctions between clauses within the query; and comparing the first set of documents and the second set of documents to identify one or more documents for inclusion in the one or more result sets.

7. A system, comprising:
one or more processors; and
a processor-readable storage device comprising processor executable instructions that, when executed by the one or more processors, causes the one or more processors to perform operations comprising:
receiving, by one or more processors, a login request for a member profile containing one or more profile fields containing terms representing a member within a social networking database;
receiving a request for an informational need from a client device at least temporarily associated with the member profile;
identifying a set of machine learned query models within the query processing machine;
selecting a machine learned query model from the set of machine learned query models based on the informational need, the machine learned query model defining conjunctional clauses of a template query, each conjunctional clause defining a tuple representing a weighted combination of a profile field and a field in target data types associated with the informational need;
generating a query by applying the one or more profile fields to the conjunctional clauses in the selected machine learned query model, eliminating any triples containing profile fields that have no data in the member profile;
causing one or more query machines to search one or more inverted indices using the query, each query machine searching at least one inverted index associated with the query machine, each inverted index of the one or more inverted indices containing an independent set of documents;
receiving one or more result sets comprising one or more documents distributed across the one or more inverted indices;
generating an ordered list of the one or more result sets; and
causing presentation of the ordered list at a client device associated with the member profile within a user interface presenting at least a portion of the member profile.

8. The system of claim 7, wherein generating the query further comprises:
in response to selecting the machine learned query model, identifying a set of input tuples based on the query input and the query type, the set of input tuples including data in a title field and an input field; and
generating the query by populating clauses of the template query, associated with the machine learned query model, with the data of the set of input tuples.

9. The system of claim 7, wherein generating the query further comprises:
accessing the member profile associated with the client device from which the query input was received;
identifying a set of profile tuples based on the query type, the set of profile tuples including data in a title field and an input field; and
generating the query by populating clauses of the template query; associated with the machine learned query model, with the data of the set of profile tuples.

10. The system of claim 7, wherein causing the one or more query machines to search the one or more inverted indices using the query further comprises:
parsing the one or more inverted indices with a first pass to identify a first set of documents for the query, the first pass excluding conjunctions between clauses within the query;
parsing the one or more inverted indices with a second pass to identify second set of documents for the query, the second pass including conjunctions between clauses within the query; and
comparing the first set of documents and the second set of documents to identify one or more documents for inclusion in the one or more result sets.

11. A processor-readable storage device comprising processor executable instructions that, when executed by one or more processors of a machine; causes the machine to perform operations comprising:
receiving, by one or more processors, a login request for a member profile containing one or more profile fields containing terms representing a member within a social networking database;
receiving a request for an informational need from a client device at least temporarily associated with the member profile;
identifying a set of machine learned query models within the query processing machine;
selecting a machine learned query model from the set of machine learned query models based on the informational need, the machine learned query model defining conjunctional clauses of a template query, each conjunctional clause defining a tuple representing a weighted combination of a profile field and a field in target data types associated with the informational need;
generating a query by applying the one or more profile fields to the conjunctional clauses in the selected machine learned query model, eliminating any tuples containing profile fields that have no data in the member profile;
causing one or more query machines to search one or more inverted indices using the query, each query machine searching at least one inverted index associated with the query machine, each inverted index of the one or more inverted indices containing an independent set of documents;
receiving one or more result sets comprising one or more documents distributed across the one or more inverted indices;
generating an ordered list of the one or more result sets; and
causing presentation of the ordered list at a client device associated with the member profile within a user interface presenting at least a portion of the member profile.

12. The processor-readable storage device of claim 11, wherein generating the query further comprises:
in response to selecting the machine learned query model, identifying a set of input tuples based on the query input and the query type, the set of input tuples including data in a title field and an input field; and
generating the query by populating clauses of a template query, associated with the machine learned query model, with the data of the set of input tuples.

13. The processor-readable storage device of claim 11, wherein generating the query further comprises:
accessing the member profile associated with the client device from which the query input was received;

identifying a set of profile tuples based on the query type, the set of profile tuples including data in a title field and an input field; and generating the query by populating clauses of a template query, associated with the machine learned query model, with the data of the set of profile tuples.

14. The processor-readable storage device of claim 11, wherein causing the one or more query machines to search the one or more inverted indices using the query further comprises:

parsing the one or more inverted indices with a first pass to identify a first set of documents for the query; the first pass excluding conjunctions between clauses within the query;

parsing the one or more inverted indices with a second pass to identify second set of documents for the query, the second pass including conjunctions between clauses within the query; and comparing the first set of documents and the second set of documents to identify one or more documents for inclusion in the one or more result sets.

* * * * *

UNITED STATES PATENT AND TRADEMARK OFFICE
CERTIFICATE OF CORRECTION

PATENT NO. : 10,515,424 B2
APPLICATION NO. : 15/430005
DATED : December 24, 2019
INVENTOR(S) : Borisyuk et al.

Page 1 of 1

It is certified that error appears in the above-identified patent and that said Letters Patent is hereby corrected as shown below:

On the Title Page

Item (71), in "Applicant", in Column 1, Line 1, after "Licensing,", insert --LLC,--

In the Claims

In Column 34, Line 51, in Claim 4, delete "e" and insert --elements with-- therefor In Column 35, Line 31, in Claim 7, delete "triples" and insert --tuples-- therefor In Column 35, Line 66, in Claim 9, delete "query;" and insert --query,-- therefor In Column 36, Line 17, in Claim 11, delete "machine;" and insert --machine,-- therefor In Column 37, Line 12, in Claim 14, delete "query;" and insert --query,-- therefor Signed and Sealed this
Twenty-first Day of April, 2020

Andrei Iancu
*Director of the United States Patent and Trademark Office*